US010711409B2

(12) United States Patent
Tsimmerman et al.

(10) Patent No.: US 10,711,409 B2
(45) Date of Patent: Jul. 14, 2020

(54) TRESTLE MAT CONSTRUCTION PANEL CONFIGURED FOR USE WITH BUILDING EQUIPMENT AND A METHOD OF MANUFACTURE AND/OR USE THEREOF

(71) Applicants: Valery Tsimmerman, Brookeville, MD (US); Kevin E Lathan, Clearwater, FL (US); Dimitrios Aikaterinidis, Bel Air, MD (US)

(72) Inventors: Valery Tsimmerman, Brookeville, MD (US); Kevin E Lathan, Clearwater, FL (US); Dimitrios Aikaterinidis, Bel Air, MD (US)

( * ) Notice: Subject to any disclaimer, the term of this patent is extended or adjusted under 35 U.S.C. 154(b) by 0 days.

(21) Appl. No.: 16/369,382

(22) Filed: Mar. 29, 2019

(65) Prior Publication Data

US 2019/0301103 A1    Oct. 3, 2019

Related U.S. Application Data

(60) Provisional application No. 62/651,868, filed on Apr. 3, 2018.

(51) Int. Cl.
*E04H 12/00* (2006.01)
*E01C 9/08* (2006.01)
*E01C 5/22* (2006.01)
*B32B 3/20* (2006.01)
*B32B 13/06* (2006.01)

(52) U.S. Cl.
CPC ............... *E01C 9/086* (2013.01); *B32B 3/20* (2013.01); *B32B 13/06* (2013.01); *E01C 5/22* (2013.01); *E01C 9/08* (2013.01); *E01C 9/083* (2013.01)

(58) Field of Classification Search
CPC . E01C 9/086; E01C 9/083; B32B 3/20; B32B 13/06
See application file for complete search history.

(56) References Cited

U.S. PATENT DOCUMENTS

| 3,301,147 | A | * | 1/1967 | Clayton | E01C 9/083 404/35 |
| 3,348,459 | A | * | 10/1967 | Harvey | E01C 9/083 404/35 |
| 3,385,183 | A | * | 5/1968 | Kortz | E01C 9/083 404/35 |
| 3,641,230 | A | * | 2/1972 | Jenks | B29C 70/08 264/152 |
| 4,283,896 | A | * | 8/1981 | Fricker | E04C 2/044 52/309.11 |
| 5,440,845 | A | | 8/1995 | Tadros | |
| 5,651,154 | A | | 7/1997 | Ahlskog | |
| 6,170,105 | B1 | | 1/2001 | Doyle | |
| 6,256,957 | B1 | * | 7/2001 | Kelly | E04D 11/02 52/309.12 |
| 6,460,213 | B1 | | 10/2002 | Flint | |

(Continued)

*Primary Examiner* — Gisele D Ford
(74) *Attorney, Agent, or Firm* — Garcia-Zamor Intellectual Property Law, LLC; Ruy Garcia-Zamor

(57) ABSTRACT

A trestle mat construction panel configured for use with building equipment and a method of manufacture and use thereof. The trestle mat construction panel is preferably formed of a partially hollow core body and strong support material to allow the construction panel to be easily placed and moved and to support various materials, such as construction equipment including cranes and the like, when in use.

20 Claims, 27 Drawing Sheets

(56) References Cited

U.S. PATENT DOCUMENTS

| | | | | |
|---|---|---|---|---|
| 6,761,007 B2* | 7/2004 | Lancelot, III | ........... | E04C 2/044 |
| | | | | 52/309.7 |
| 6,955,014 B2 | 10/2005 | Lejeune | | |
| 8,312,683 B2* | 11/2012 | Tadros | ................... | E04C 2/044 |
| | | | | 52/309.11 |
| 8,555,584 B2* | 10/2013 | Ciuperca | ................ | E04B 1/355 |
| | | | | 52/309.12 |
| 8,713,887 B2* | 5/2014 | Williams | .............. | E04C 5/0618 |
| | | | | 264/31 |
| 10,011,988 B2* | 7/2018 | Foderberg | ................ | E04C 2/34 |
| 2003/0072920 A1* | 4/2003 | Klinger | ................... | E04C 2/34 |
| | | | | 428/188 |
| 2007/0237581 A1* | 10/2007 | Lukasik | ................... | E01O 5/18 |
| | | | | 404/35 |
| 2010/0006626 A1 | 1/2010 | Marschke | | |
| 2017/0298581 A1 | 10/2017 | Lewit | | |

* cited by examiner

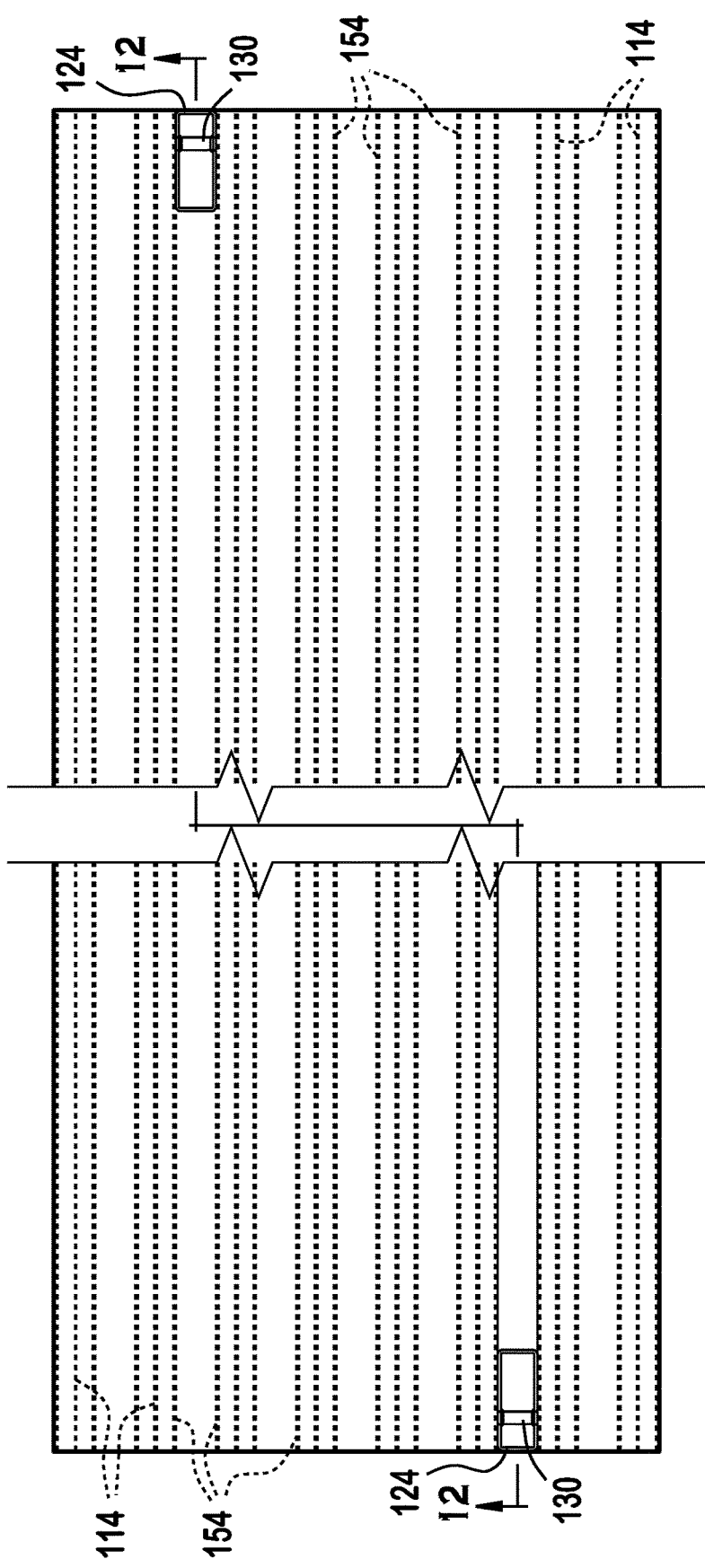
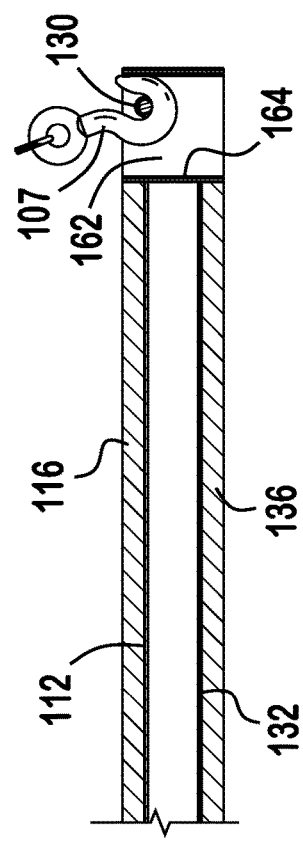
FIG. 11
FIG. 12

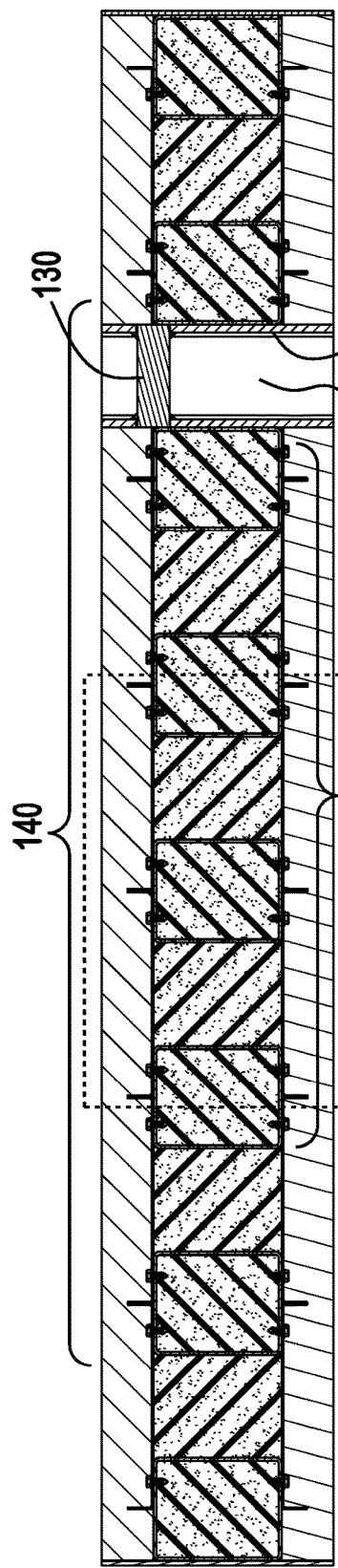
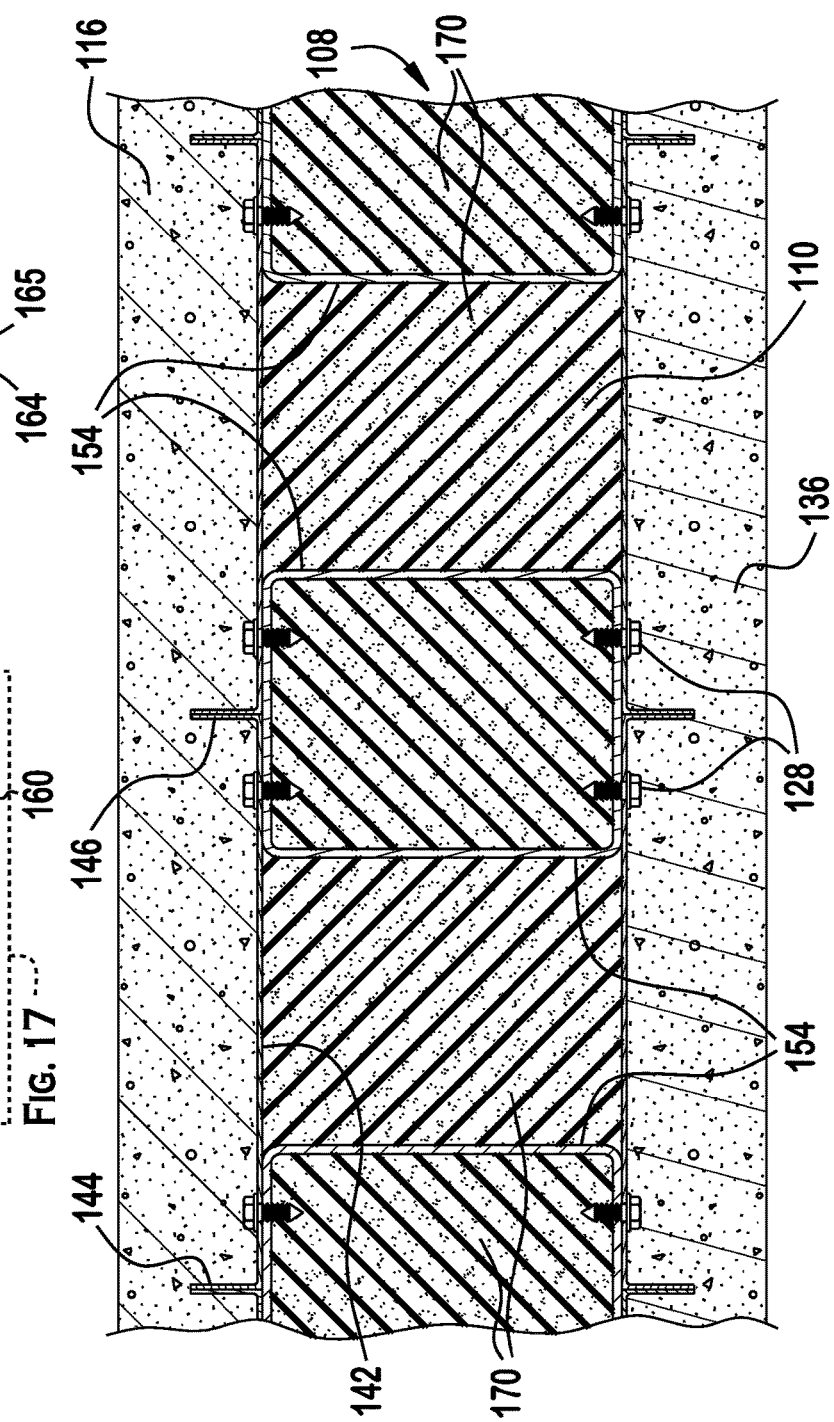
FIG. 16
FIG. 17

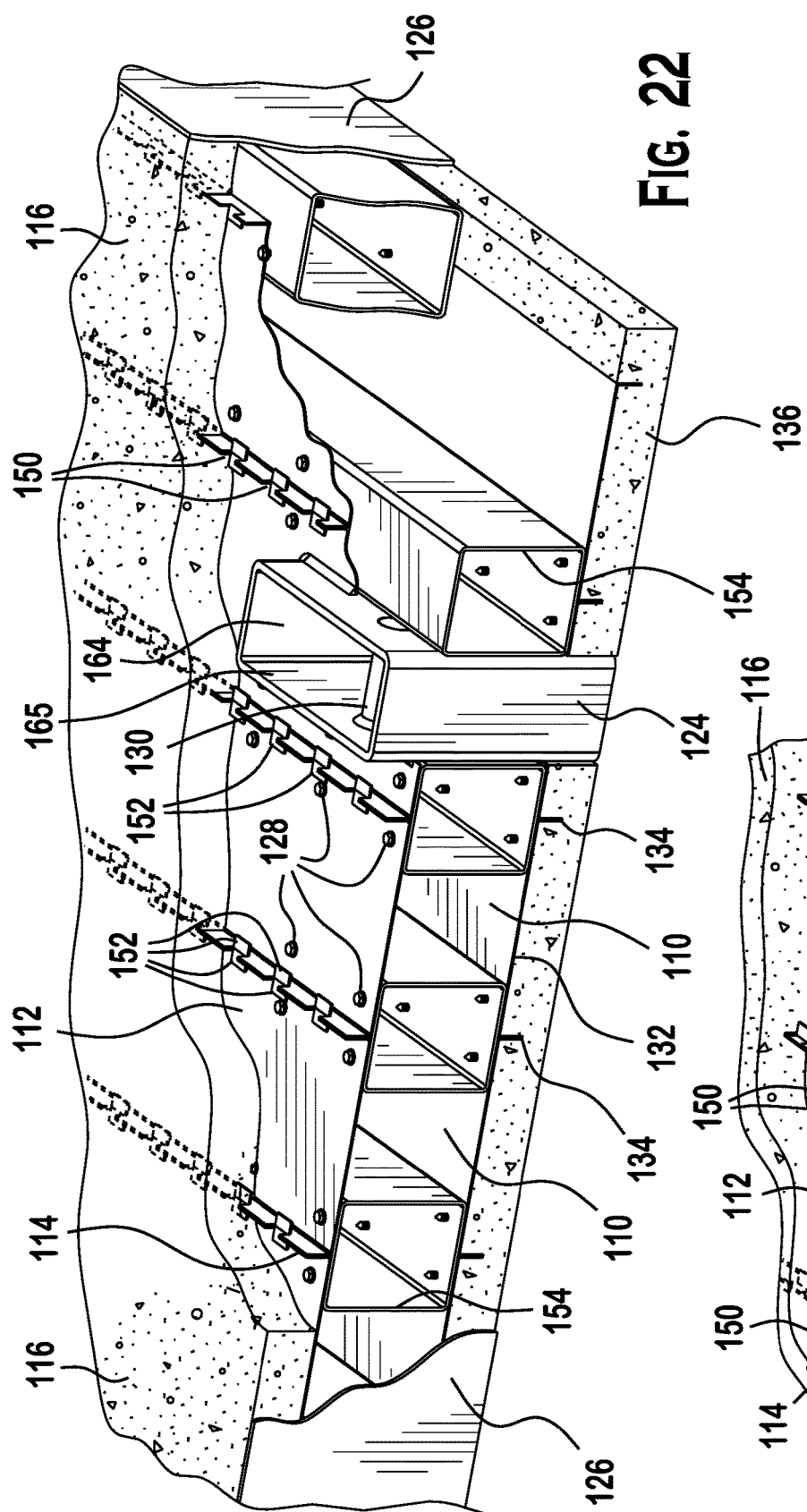
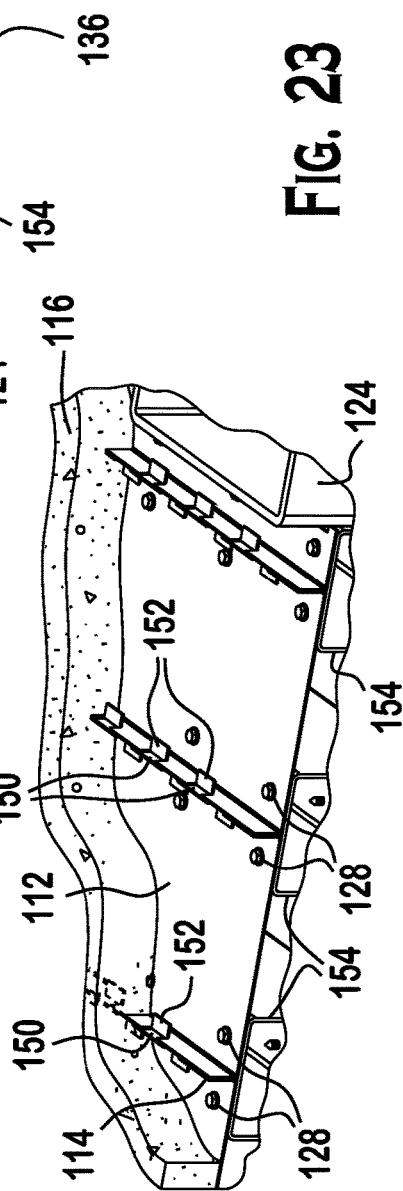
FIG. 22
FIG. 23

TRESTLE MAT CONSTRUCTION PANEL CONFIGURED FOR USE WITH BUILDING EQUIPMENT AND A METHOD OF MANUFACTURE AND/OR USE THEREOF

CROSS REFERENCE TO RELATED APPLICATIONS

This application claims priority to and benefit of US provisional patent application 62/651,868, filed Apr. 3, 2018, which is hereby incorporated by reference in its entirety as if fully set forth herein.

BACKGROUND

The present invention is generally directed to platforms and structures and, more specifically, construction equipment. More specifically still, the invention is directed toward a trestle mat construction panel which may be customizeably built, moved, and placed below a crane to provide a secure foundation for use of the crane.

Construction machinery, such as cranes and tower cranes, typically move heavy objects and lift them high into the air. Wind and unstable ground conditions can cause crane collapses, which have historically caused serious injuries and property damage. Trestle mats, such as wooden planks, may be used to create a stronger base for the crane, including the crane feet which are often positioned on outriggers. These are most notably used in swampy areas and for construction projects in the oil and gas, highway construction, and electrical infrastructure industries.

Yet construction mats are often either too unstable to provide a suitable foundation for all construction projects, or are too heavy to be easily moved and rearranged as needed.

It may be advantageous to provide a trestle mat which combines open space within a core with a heavy and firm exterior to provide a strong but suitably portable construction mat. It may be further advantageous to provide a construction mat which can be linked with other mats to provide a large platform which can be moved and assembled as needed. It may be further advantageous to provide a trestle construction mat which can be assembled on site, and may provide for easier movement of the trestle construction mat.

SUMMARY

Briefly speaking, one embodiment of the present invention is directed to a construction panel which includes a core body having first and second major surfaces being spaced apart and generally parallel to each other. The first and second major surfaces may be spaced around a plurality of tubes, with a plurality of voids defined by the tubes and the major surfaces. The first major surface may include a first plurality of anchors disposed thereon and extending generally outwardly from the core body, and the second major surface may also include a second plurality of anchors disposed thereon and extending generally outwardly from the core body. A first strengthening layer may then be secured to the first major surface, with the first plurality of anchors embedded therein, and a second strengthening layer may be secured to the second major surface, with the second plurality of anchors embedded therein.

In a separate embodiment, the present invention is directed to a construction panel includes a core body with first and second major surfaces being spaced apart and generally parallel to each other around a plurality of beams having an I- or C-shape when viewed in cross section, with a plurality of voids defined by the beams and the major surfaces. The first major surface may include a first plurality of anchors disposed thereon and extending generally outwardly from the core body, and the second major surface may also include a second plurality of anchors disposed thereon and extending generally outwardly from the core body. A first strengthening layer may then be secured to the first major surface, with the first plurality of anchors embedded therein, and a second strengthening layer may be secured to the second major surface, with the second plurality of anchors embedded therein.

In a separate embodiment, the present invention is directed to a construction panel which includes a core body with first and second major surfaces being spaced apart and generally parallel to each other around a corrugated support member, with a plurality of voids defined by the corrugated support member and the major surfaces. In some embodiments, the corrugated support member may be formed by a plurality of sub-members rather than by a single member. In some embodiments, the corrugated support member may have the shape of a square sine wave, while in other embodiments, the corrugated support member may have the shape of a trapezoidal sine wave.

In a separate embodiment, the present invention is directed to a construction panel which includes a core body with first and second major surfaces being spaced apart and generally parallel to each other, with a plurality of voids defined there between. The first major surface may include a first plurality of anchors disposed thereon and extending generally outwardly from the core body, and the second major surface may also include a second plurality of anchors disposed thereon and extending generally outwardly from the core body. A first strengthening layer may then be secured to the first major surface, with the first plurality of anchors embedded therein, and a second strengthening layer may be secured to the second major surface, with the second plurality of anchors embedded therein. The first major surface may be formed by a first plurality of sub-plates, and the second major surface may be formed by a similar second plurality of sub-plates. In some embodiments, the sub-plates may have a U-shape, with a base section and first and second flange sections. In other embodiments, the sub-plates may have an L-shape, with a base section and a single flange section. In some embodiments, the sub-plates may overlap one another, while in other embodiments, the sub-plates do not overlap.

In a separate embodiment, the construction panel includes a core body with first and second major surfaces being spaced apart and generally parallel to each other around a plurality of tubes, with a plurality of voids defined by the tubes and the major surfaces. The first major surface may include a first plurality of anchors disposed thereon and extending generally outwardly from the core body, and the second major surface may also include a second plurality of anchors disposed thereon and extending generally outwardly from the core body. A first strengthening layer may then be secured to the first major surface, with the first plurality of anchors embedded therein, and a second strengthening layer may be secured to the second major surface, with the second plurality of anchors embedded therein. In some embodiments, the first and/or second plurality of anchors may include a plurality of cut-outs and a plurality of flaps, which may increase the strength of the anchors in embedding into the first and/or second strengthening layers, respectively. In alternate embodiment, this effect may be achieved by crimping the anchors.

In alternate embodiments, the construction panel of other embodiments may include a shear-sleeve which may be inserted into shear-sleeve holes in the tubes of one or more construction panels. The shear-sleeve may be configured to allow a lift cable to be inserted there though to allow multiple construction panels to be lifted at once. Alternatively, the construction panel may include tie-point boxes with lift anchors, preferably positioned at diagonally opposed corners of the construction panel, to allow a crane hook to lift the construction panel while the construction panel maintains an orientation which is roughly horizontal and parallel to the ground.

In a separate embodiment, the present invention is directed to a construction panel which includes a core body with first and second major surfaces being spaced apart and generally parallel to each other around a support member, with a plurality of voids defined by the core body. The construction panel may be used for general purpose construction to form wall panels in buildings, roofing, flooring, trestle mats, decking, or the like.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 11 is a top plan view of the construction panel 100, showing the plurality of tubes in broken lines, to show the preferred placement of the tie-point boxes 124 at opposing corners of the construction panel 100 in one of the plurality of voids 110.

FIG. 12 is a cross-sectional view of the construction panel 100 as taken along lines 12-12 of FIG. 11. The figure shows that the tie-point boxes 124 include a passage 164 through the core body 108 defined by a perimeter sidewall 165. The tie-point boxes 124 may also include a lift anchor 130 onto which crane hooks 107 may be places, to better facilitate lifting the construction panel 100 by crane 102.

FIG. 16 is an alternate cross-sectional view of the construction panel 100 of FIG. 15. The figure further shows that the insulation 170 in the tubes 154 and the insulation 170 forming the voids 110 may be formed of different materials, with diagonal lines of different orientations being used to demonstrate each.

FIG. 17 is a cross-sectional view of the construction panel 100 of FIG. 16 as taken along the dashed lines in FIG. 16. The figure further shows the insulation 170, and that fasteners 128 may be driven therethrough.

FIG. 22 is a partial cross-sectional view of a preferred embodiment of the construction panel 100 showing that the first plurality of anchors 114 may form alternating flaps 152 and cutouts 150. These may provide additional horizontal and vertical surfaces for the first strengthening layer 116 to grip. For example, if the first strengthening layer 116 is concrete, it may flow under the flaps 152 and through the cutouts 150, creating more contact between the first strengthening layer 116 and the core body 108. Those of ordinary skill in the art will appreciate from this disclosure that the second plurality of anchors 134 may also include a plurality of flaps 152 and a plurality of cutouts 150 to better secure the second strengthening layer 136 to the core body 108.

FIG. 23 is a partial enhanced view of the partial cross-sectional view of the first plurality of anchors 114 to better show the preferred configuration of the flaps 152 and cut-outs 150. Those of ordinary skill in the art will appreciate from this disclosure that the flaps 152 and/or cut-outs 150 may be provided in any number and in any shape without exceeding the scope of this disclosure.

The figure shows how the weight of the construction panel 100 may be distributed generally evenly along the shear-sleeve 138 through the use of shear-sleeve holes 139 through multiple tubes 154.

Figure 25:
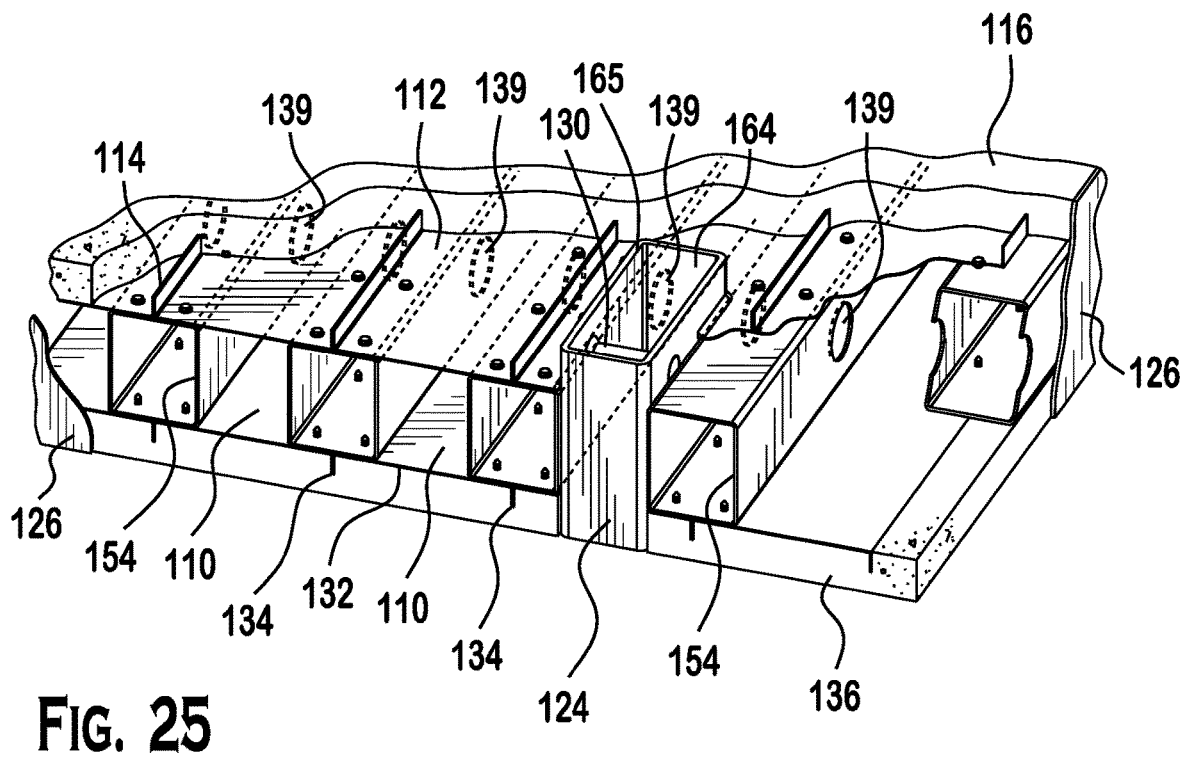
FIG. 25 is a partial cross-sectional view of the construction panel 100 of a preferred embodiment, showing an embodiment in which some or all of the plurality of tubes 154 may include shear-sleeve holes 139 therethrough. The shear-sleeve holes 139 preferably allow for the insertion of a shear-sleeve 138 through the core body 108 of one or more construction panels 100. This may allow several construction panels 100 to be moved simultaneously.
Figure 26:
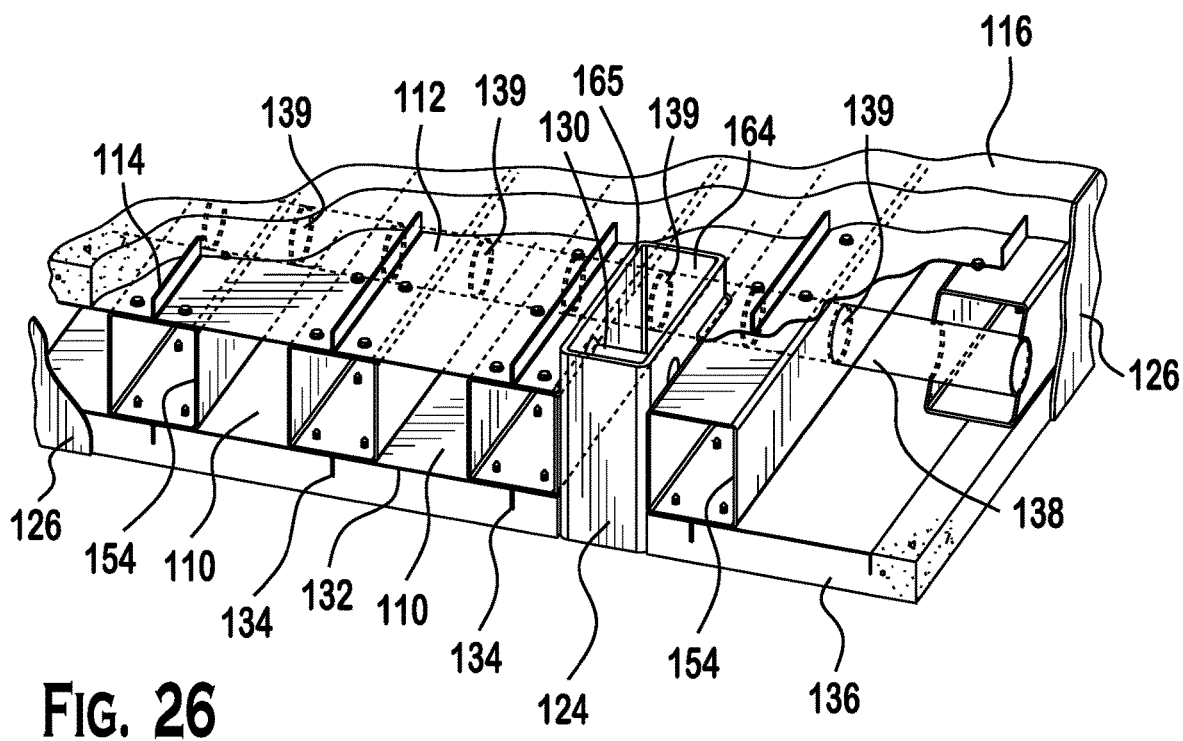
FIG. 26 is a partial cross-sectional view of the construction panel 100 of FIG. 25 with a shear-sleeve 138 through plurality of holes 139 in each of the plurality of tubes 154.
Figure 27:
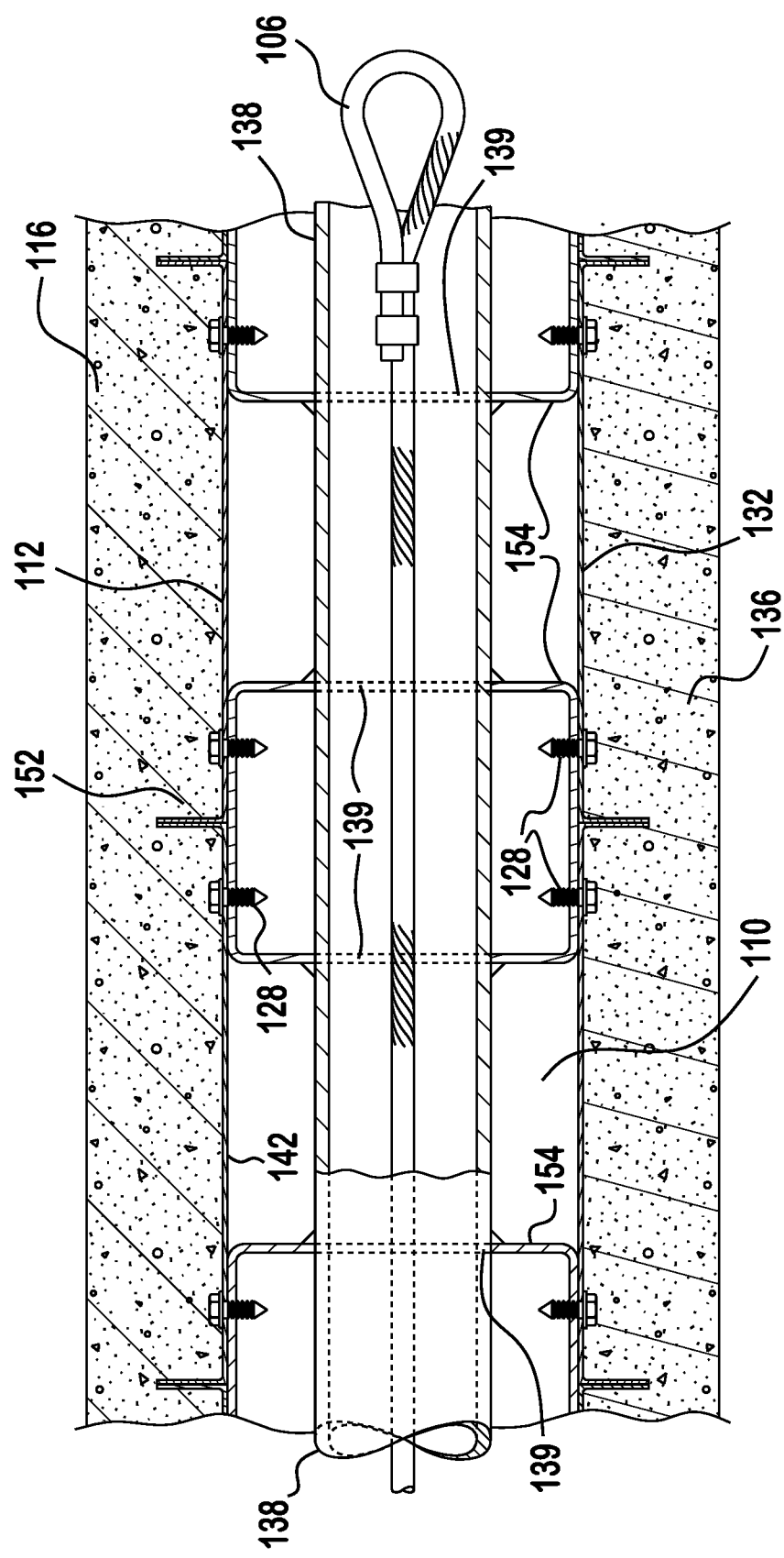

FIG. 27 is a partial cross-sectional view of the construction panel 100 of FIG. 25 with a shear-sleeve 138 through a plurality of shear-sleeve holes 139 in each of the plurality of tubes 154. The figure shows that in this preferred embodiment, a lift cable 106 may be threaded through the shear-sleeve 138 to facilitate the lifting of multiple construction panels 100 using crane hooks 107.

Figure 28:
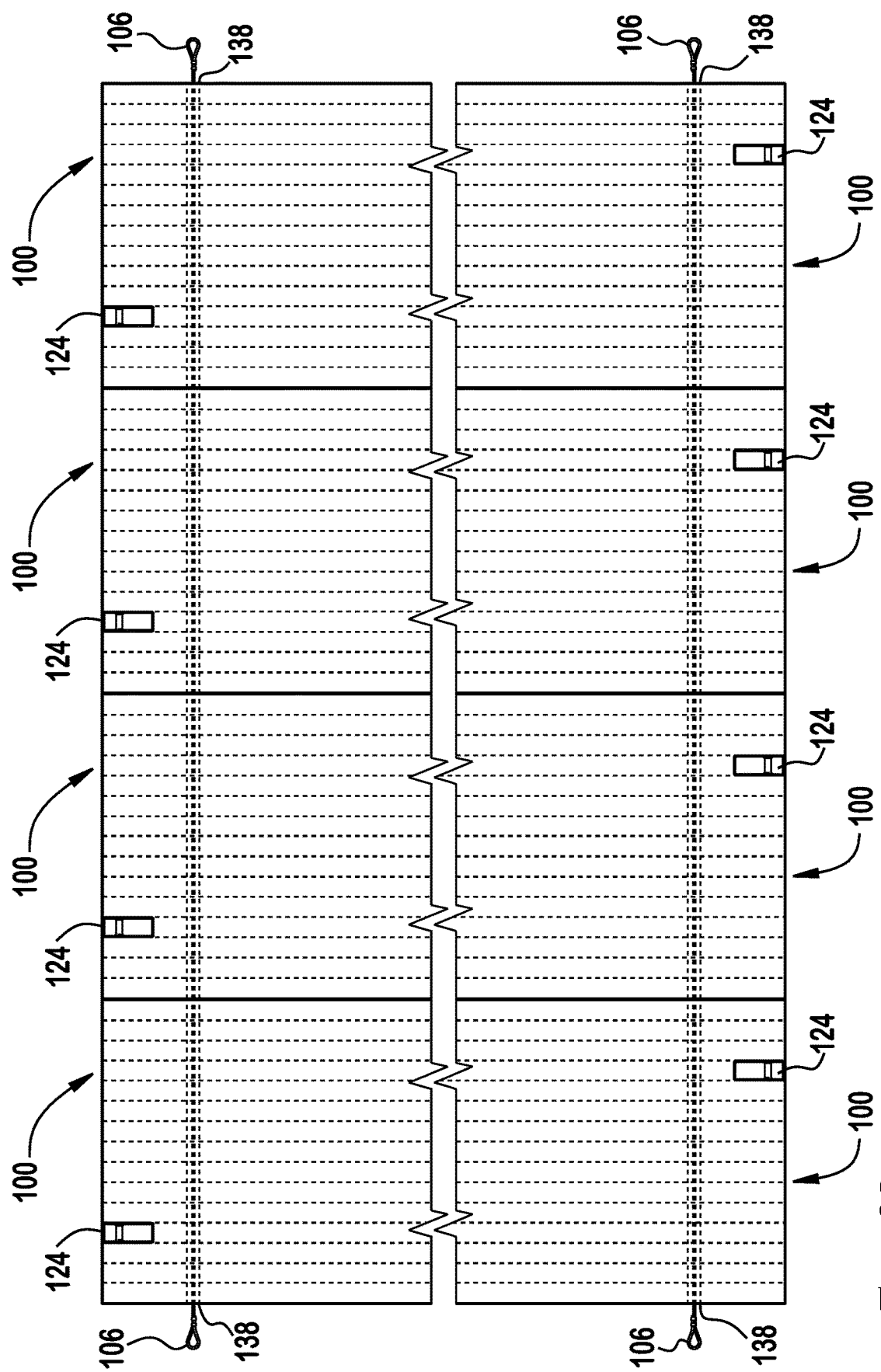

FIG. 28 is broken plan view of construction panels 100 of FIG. 25 with lift cables 106 through shear-sleeves 138 in each of the plurality of tubes 154 along two lateral sides of the construction panels 100. Through such a configuration, all four construction panels 100 shown may be lifted and moved simultaneously.

Figure 29:
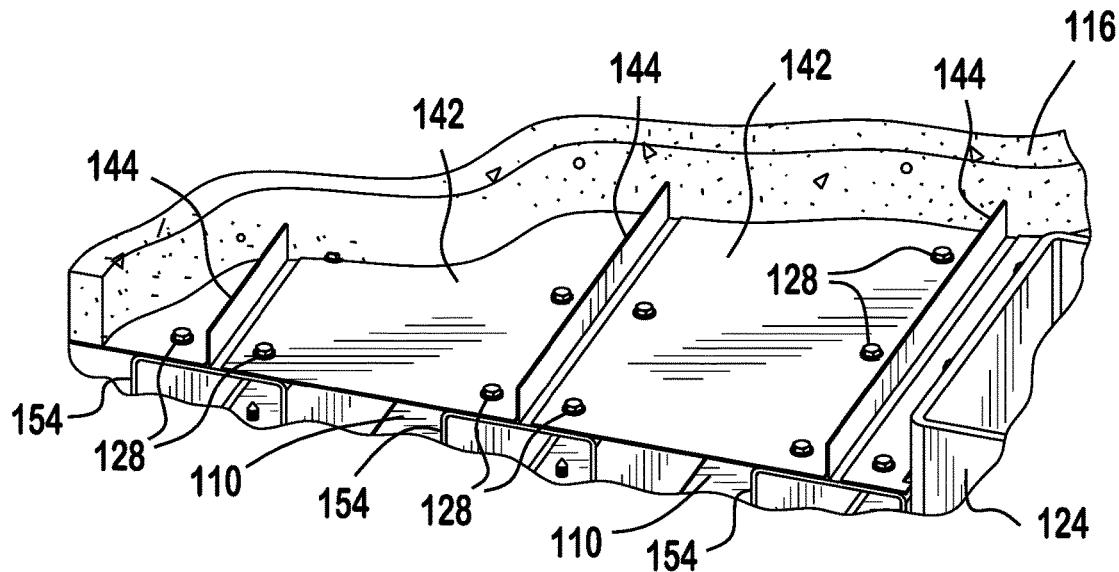

FIG. 29 is a partial cross-sectional view of an alternate preferred embodiment of the construction panel 100, in which the first major surface 112 is formed by a first plurality of sub-plates 140. It is preferred that the sub-plates 140 not overlap, and that a portion of the first major surface 112 is formed by a portion of the plurality of tubes 154. In such an embodiment, the first plurality of sub-plates 140 may include a base section 142 and a single flange section 144, thus forming an L-shape. The second major surface 132 may be formed by a second plurality of sub-plates 160, which also preferably do not overlap. A portion of the second major surface 132 may also be formed by a portion of the plurality of tubes 154. Like the first plurality of sub-plates 140, the second plurality of sub-plates 160 preferably includes a base section 142 and a single flange section 144 to form an L-shape.

Figure 30:
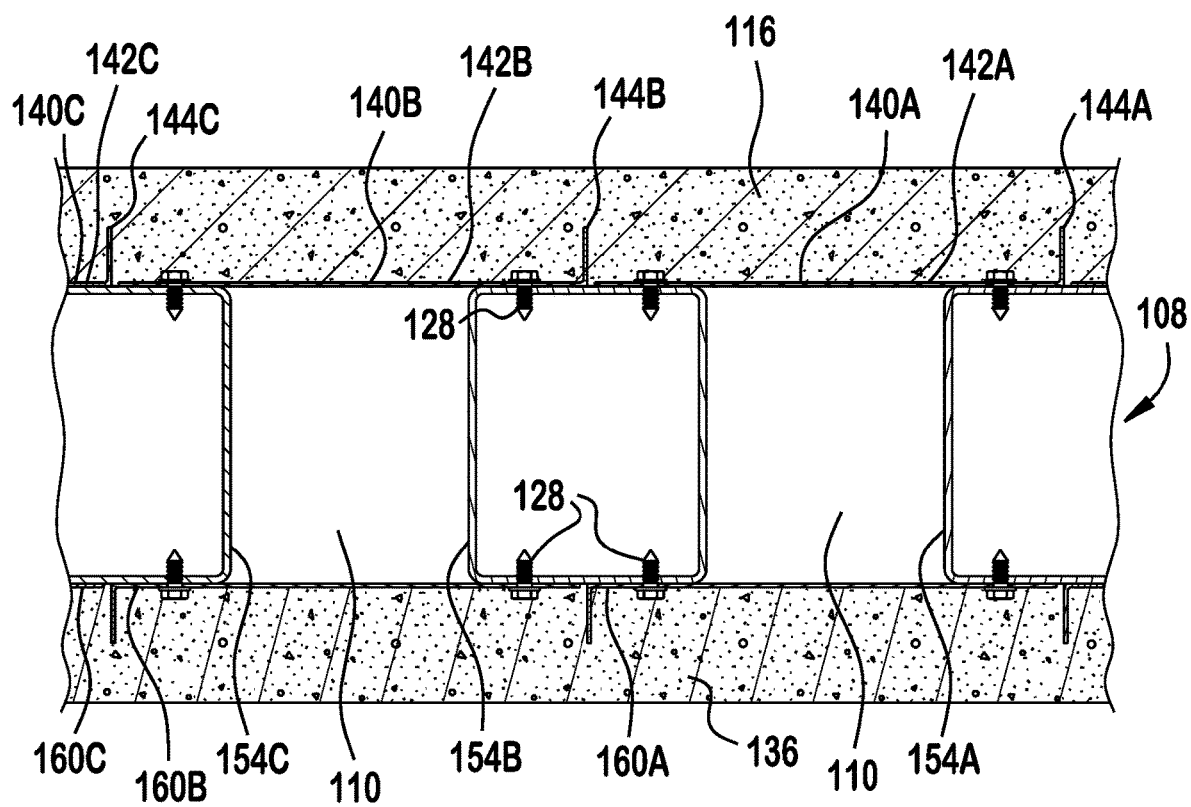

FIG. 30 is an alternate view of FIG. 28, demonstrating that in the preferred embodiment, each of the first plurality of sub-plates 140 may be affixed to two of the plurality of tubes 154 via fasteners 128. Thus, a first of the first plurality of sub-plates 140A, having a base section 142A and a single flange section 144A, is affixed to a first tube 154A and a second tube 154B; the second of the first plurality of sub-plates 140B, having a base section 142B and a single flange section 144B, is affixed to the second tube 154B and a third tube 154C; and a third of the first plurality of sub-plates 140C, having a base section 142C and a single flange section 144C, is affixed to the third tube 154C and an additional tube 154 which is not shown. Those of ordinary skill in the art will appreciate from this disclosure that the second plurality of sub-plates 160 are preferably configured in a similar manner.

Figure 31:
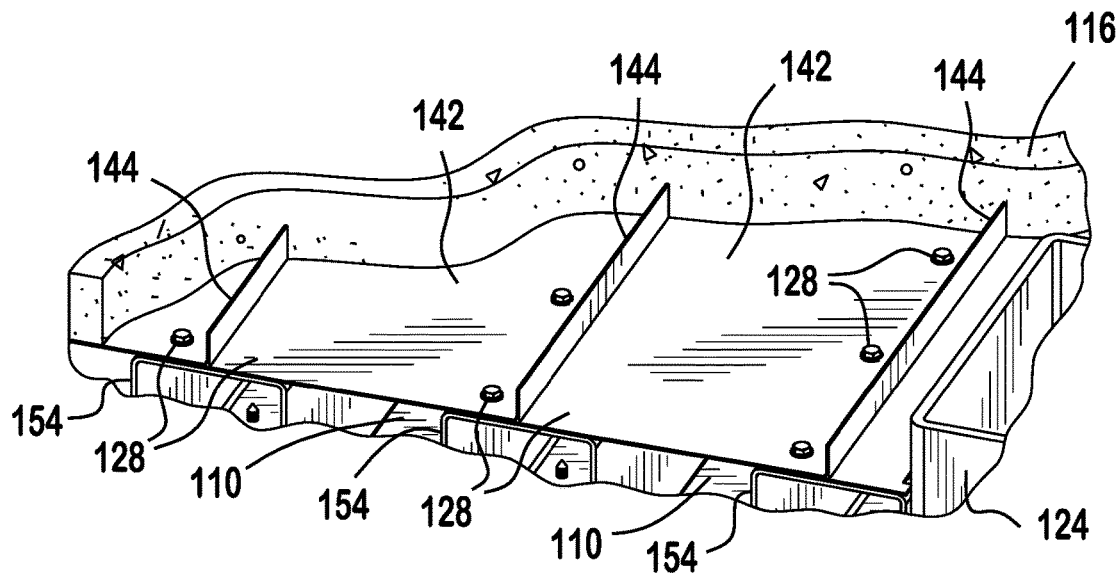

FIG. 31 is a partial cross-sectional view of an alternate preferred embodiment of the construction panel 100 in which the first major surface 112 is formed of a first plurality of sub-plates 140 in an L-shape, each having a base section 142 and a single flange section 144. In this preferred embodiment, the sub-plates 140 overlap, with each fastener 128 passing through two sub-plates 140. Those of ordinary skill in the art will appreciate from this disclosure that the second plurality of sub-plates 160 are preferably configured in a similar manner.

Figure 32:
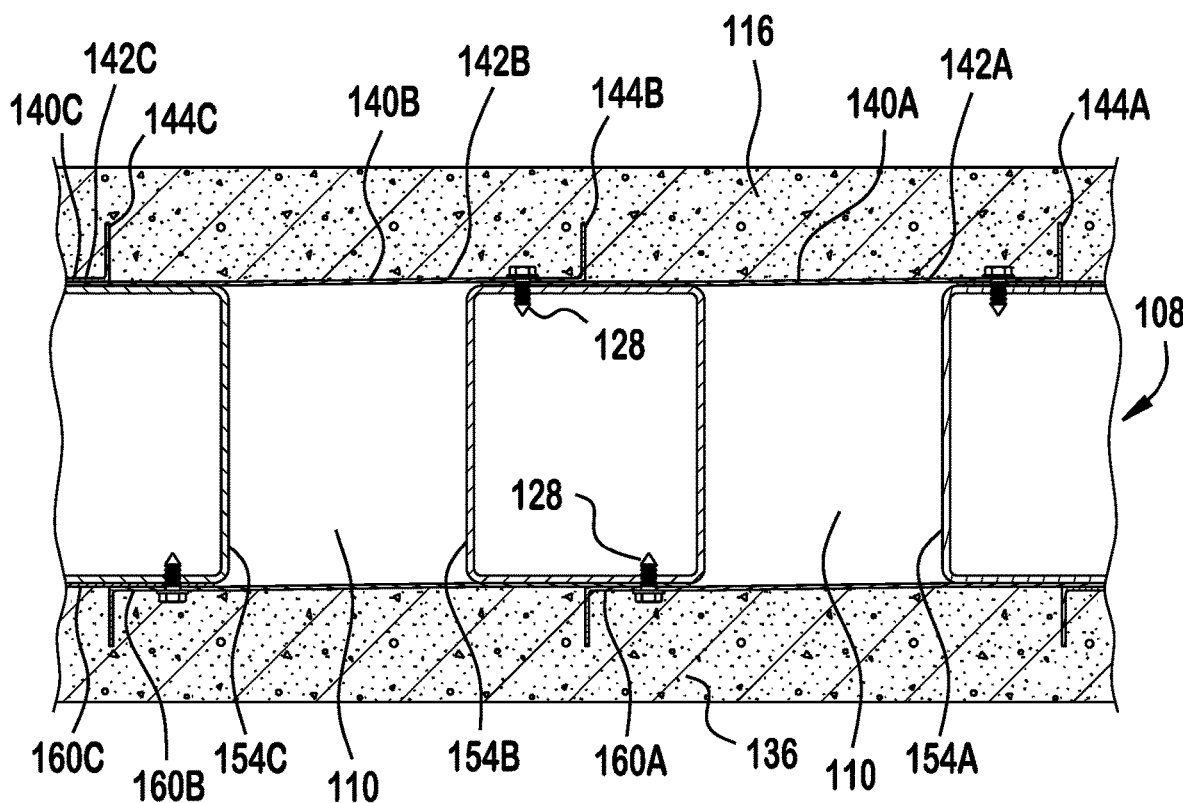

FIG. 32 is an alternate view of FIG. 31, demonstrating that in the preferred embodiment, each of the first plurality of sub-plates 140 may be affixed to two of the plurality of tubes 154 via fasteners 128. Thus, a first of the first plurality of sub-plates 140A, having a base section 142A and a single flange section 144A, is affixed to a first tube 154A and a second tube 154B; the second of the first plurality of sub-plates 140B, having a base section 142B and a single flange section 144B, is affixed to the second tube 154B and a third tube 154C; and a third of the first plurality of sub-plates 140C, having a base section 142C and a single flange section 144C, is affixed to the third tube 154C and an additional tube 154 which is not shown. A single row of fasteners 128 may hold both the first of the first plurality of sub-plates 140A and the second of the first plurality of sub-plates 140B to the same tube 154B. Similarly, a first of the second plurality of sub-plates 160A is affixed to a first tube 154A and a second tube 154B; the second of the second plurality of sub-plates 160B is affixed to the second tube 154B and a third tube 154C; and a third of the second plurality of sub-plates 160C is affixed to the third tube 154C and an additional tube 154, which is not shown.

Figure 33:
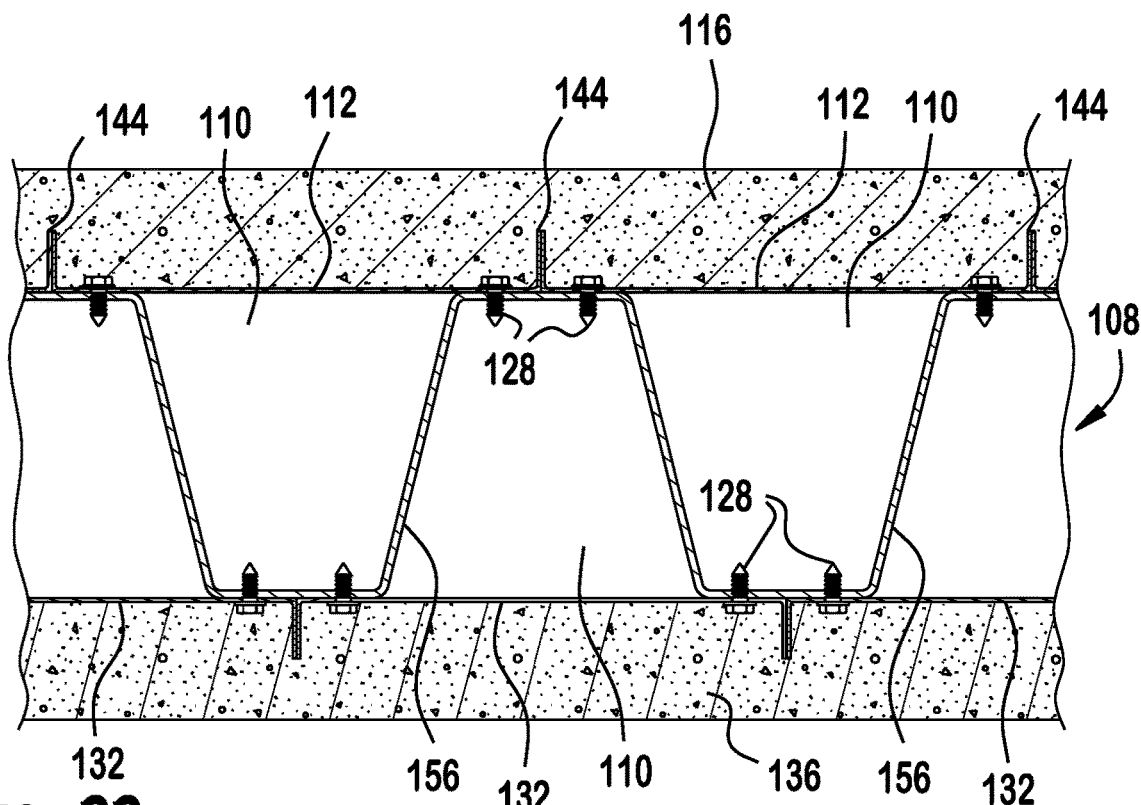

FIG. 33 is a partial cross-sectional view of an alternate preferred embodiment of the construction panel 100 in which the core body 108 includes a corrugated support member 156 which defines a plurality of voids 110 and does not include a plurality of tubes 154. Such a configuration may provide for simpler transportation and construction of the construction panel 100. The corrugated support member 156 may include alternating diagonal and horizontal sections meeting at angles, creating the rough shape of a trapezoidal sine wave.

Figure 34:
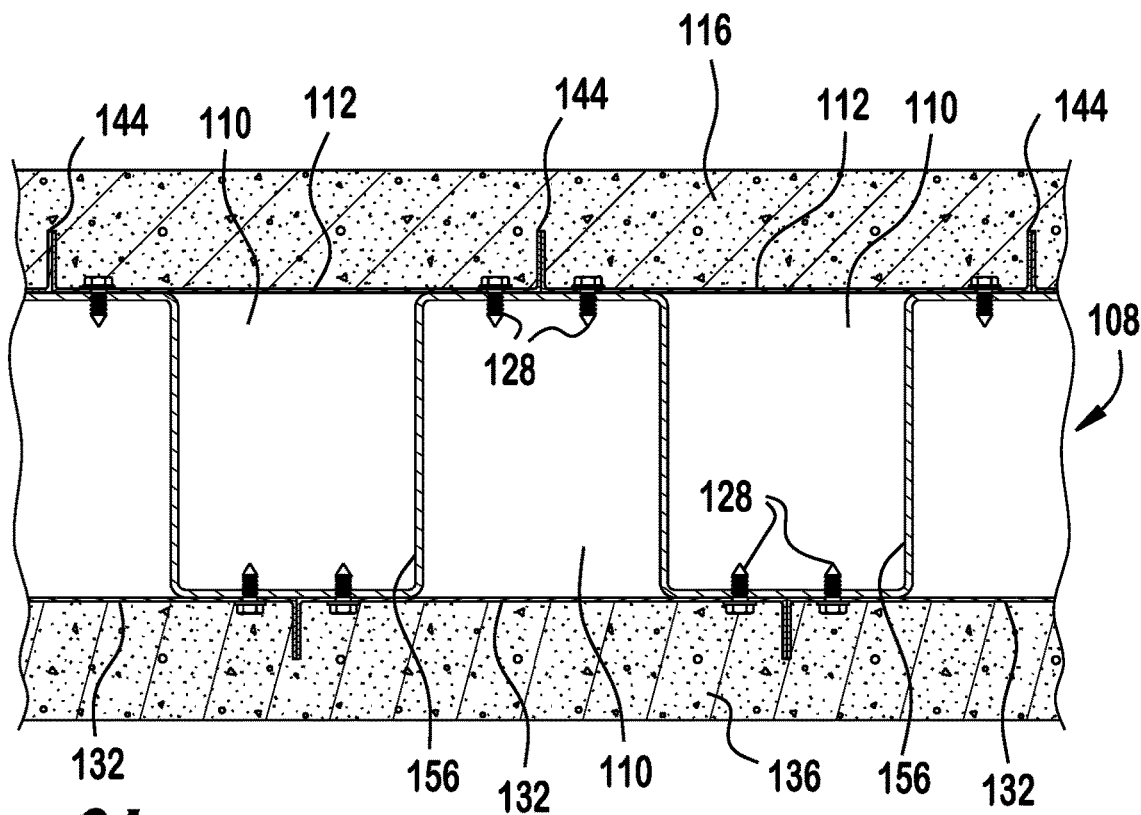

FIG. 34 is an alternate partial cross-sectional view of the construction panel 100 of FIG. 33 in which the corrugated support member 156 may include alternating horizontal and vertical sections meeting at approximate right angles, creating the rough shape of a square sine wave.

Figure 35:
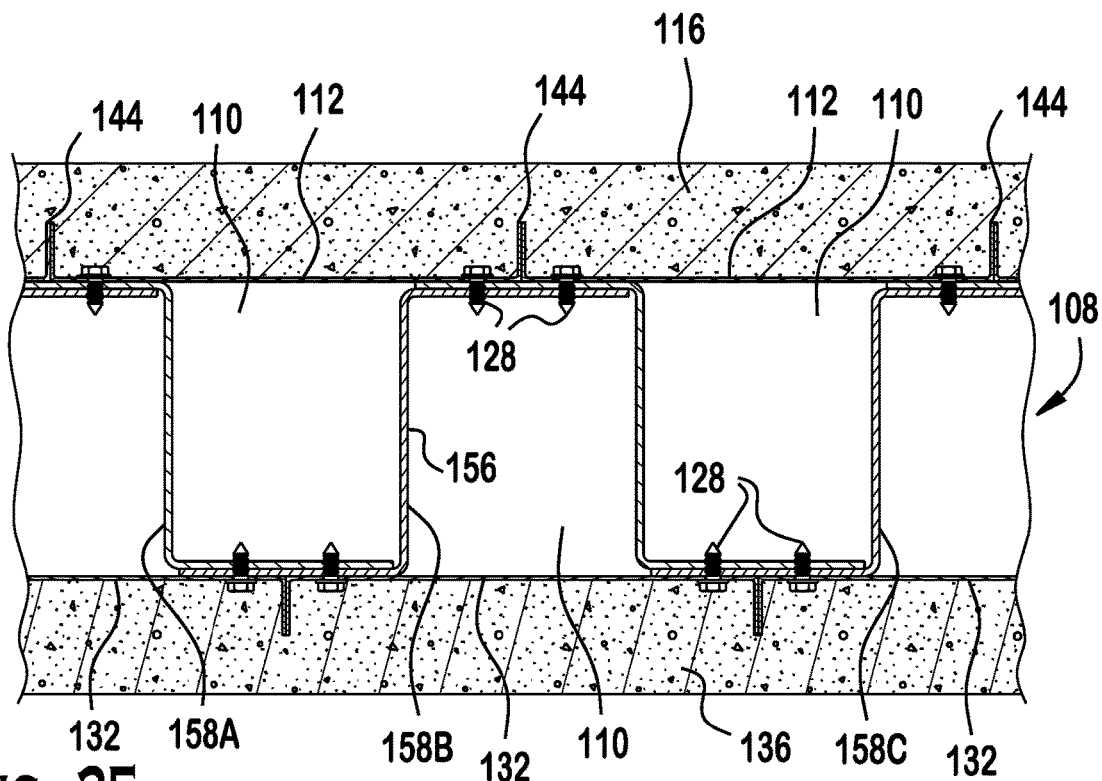

FIG. 35 is an alternate partial cross-sectional view of the construction panel 100 of FIG. 34 in which the corrugated support member 156 in the shape of a square sine wave may be formed of a plurality of sub-members 158. The corrugated support member 156 is shown formed of at least a first sub-member 158A, a second sub-member 158B, and a third sub-member 158C, with horizontal portions of each overlapping another sub-member 158.

Figure 36:
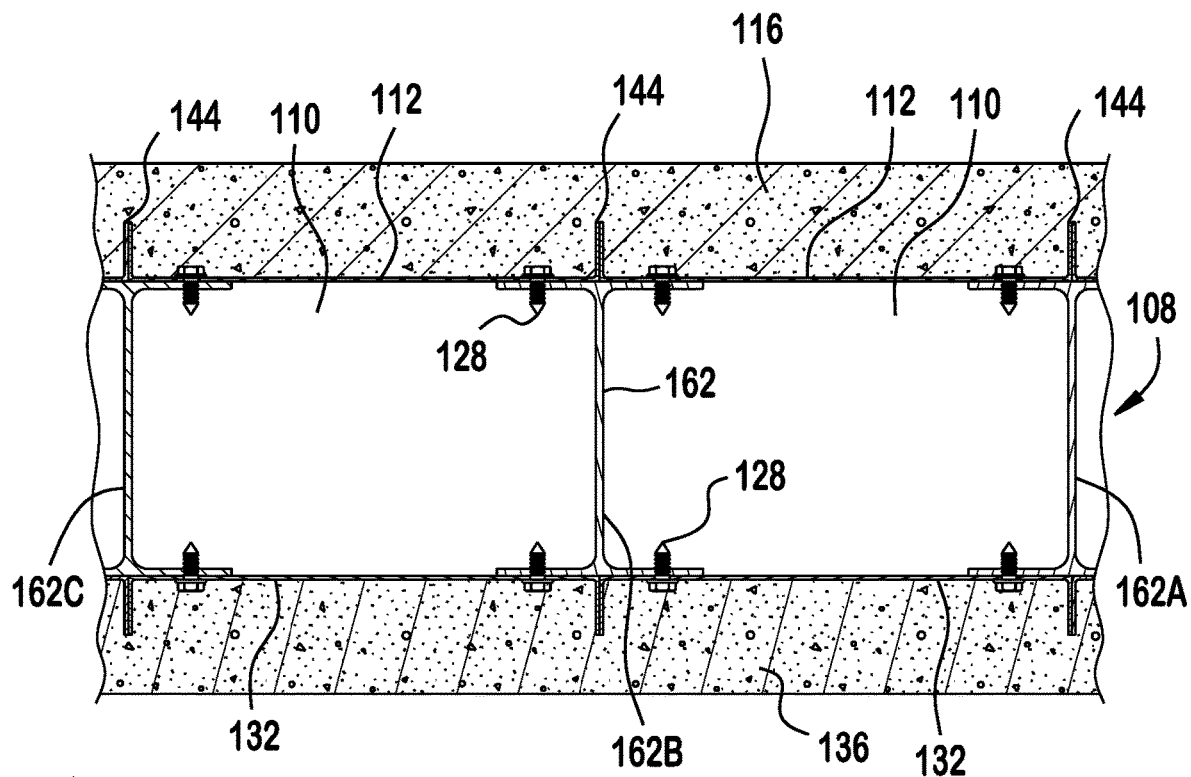

FIG. 36 is a partial cross-sectional view of an alternate preferred embodiment of the construction panel 100 in which the core body 108 is formed of a plurality of beams 162, such as the first beam 162A, second beam 162B, and third beam 162C. The beams 162 may support the first and second major surfaces 112, 132, and also define a plurality of voids 110. In a preferred embodiment, the plurality of beams 162 may form a rough I-shape. In an alternate preferred embodiment, the plurality of beams 162 may form a rough C-shape. Those of ordinary skill in the art will appreciate from this disclosure that the plurality of beams 162 may form any suitable shape.

Figure 37:
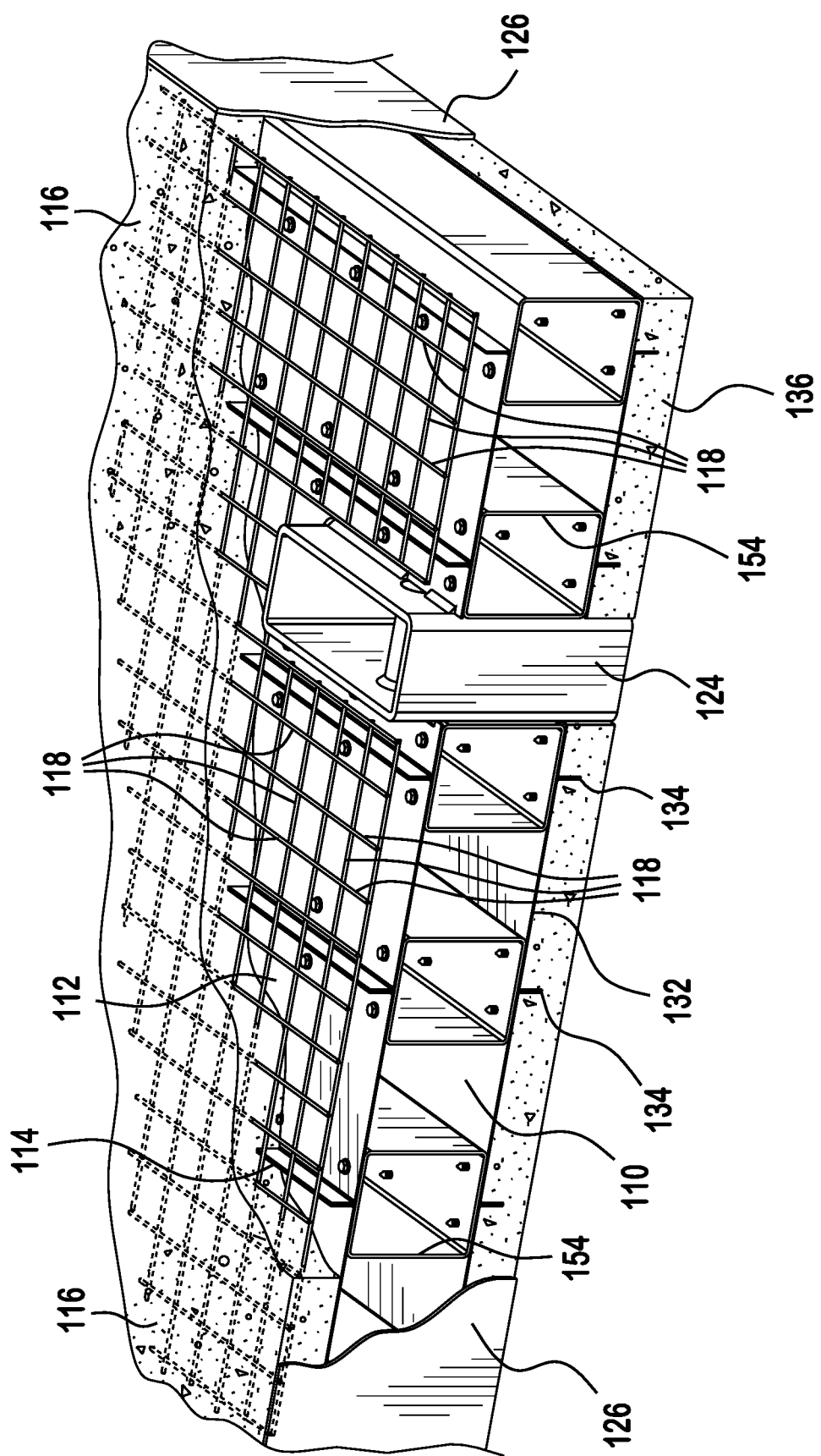

FIG. 37 is a partial cross-sectional view of an alternate preferred embodiment of the construction panel 100 with a first mesh 118 is positioned along the first plurality of anchors 114 and covered by the first strengthening layer 116. The first mesh 118 may provide crack resistance and horizontal strength to the first strengthening layer 116.

Figure 38:
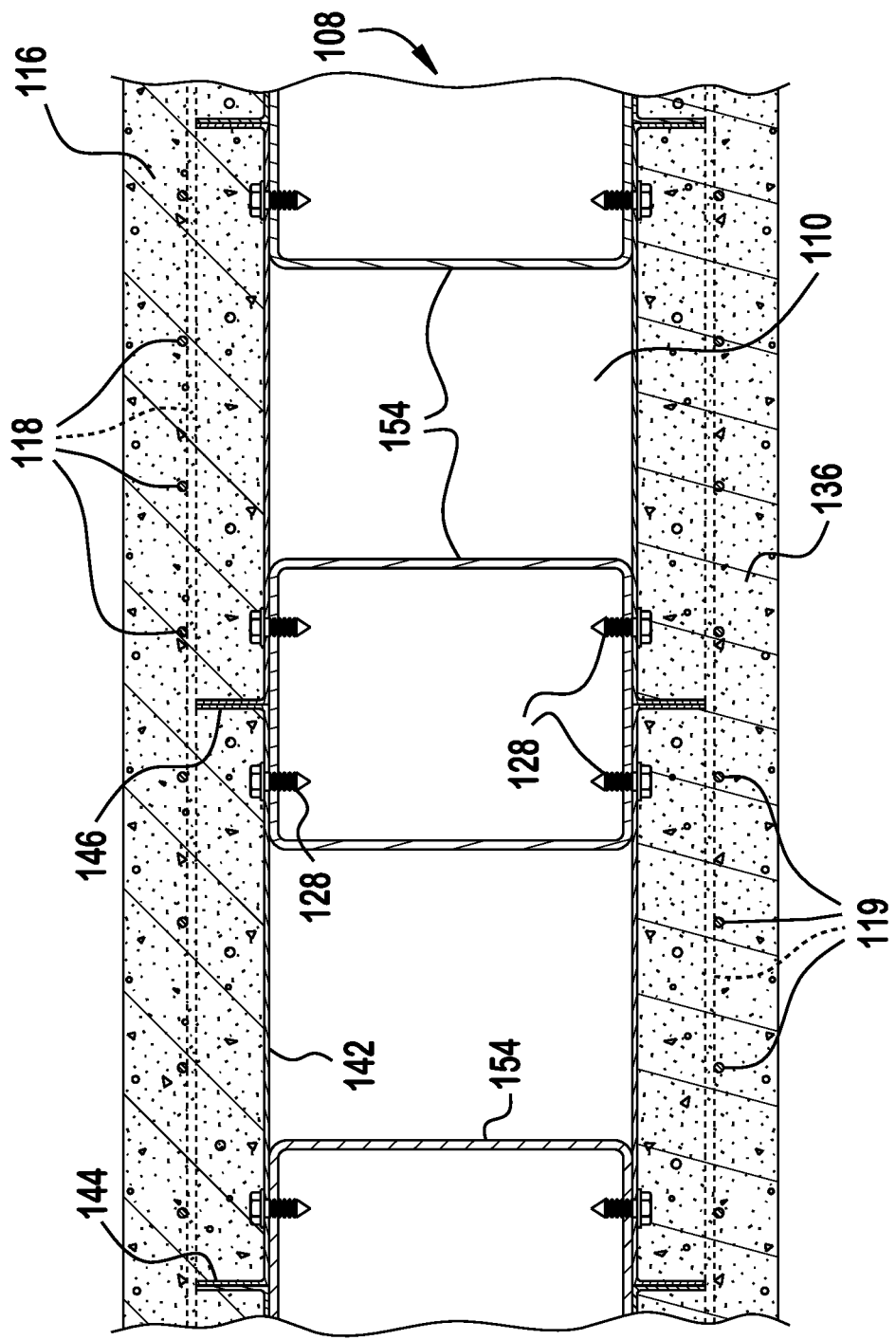

FIG. 38 is an alternate partial cross-sectional view of the construction panel 100 of FIG. 37 in which a second mesh 119 placed along the second plurality of anchors 134 and covered by the second strengthening layer 136. The second mesh 119 may provide crack resistance and horizontal strength to the second strengthening layer 136.

Figure 39:
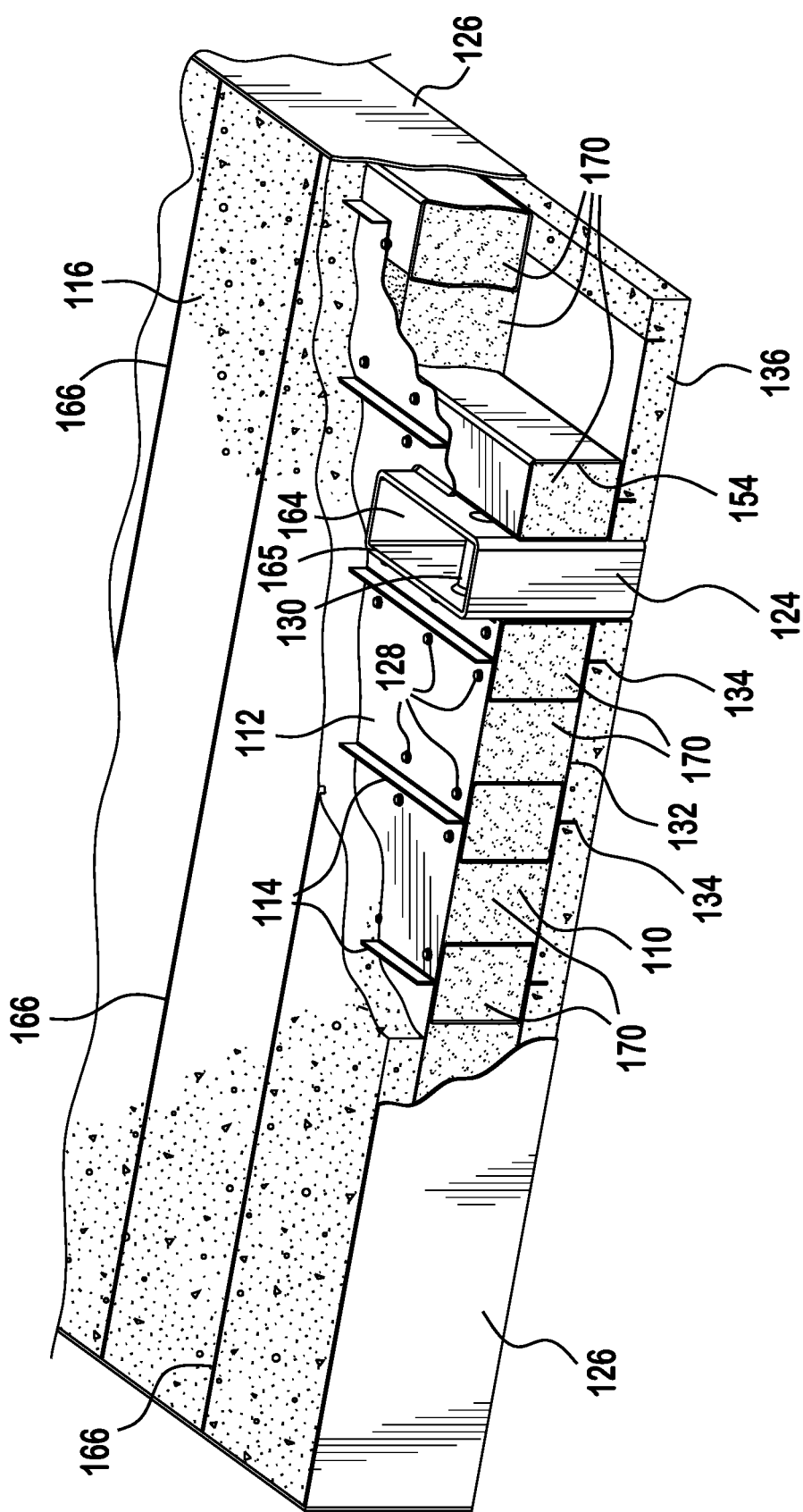

FIG. 39 is a partial cross-sectional view of an alternate preferred embodiment of the construction panel 100 in which the first strengthening layer 116 includes a plurality of strengthening layer grooves 166 to provide increased crack control. Those of ordinary skill in the art will appreciate from this disclosure that the second strengthening layer 136 may also include strengthening layer grooves 166.

Figure 40:
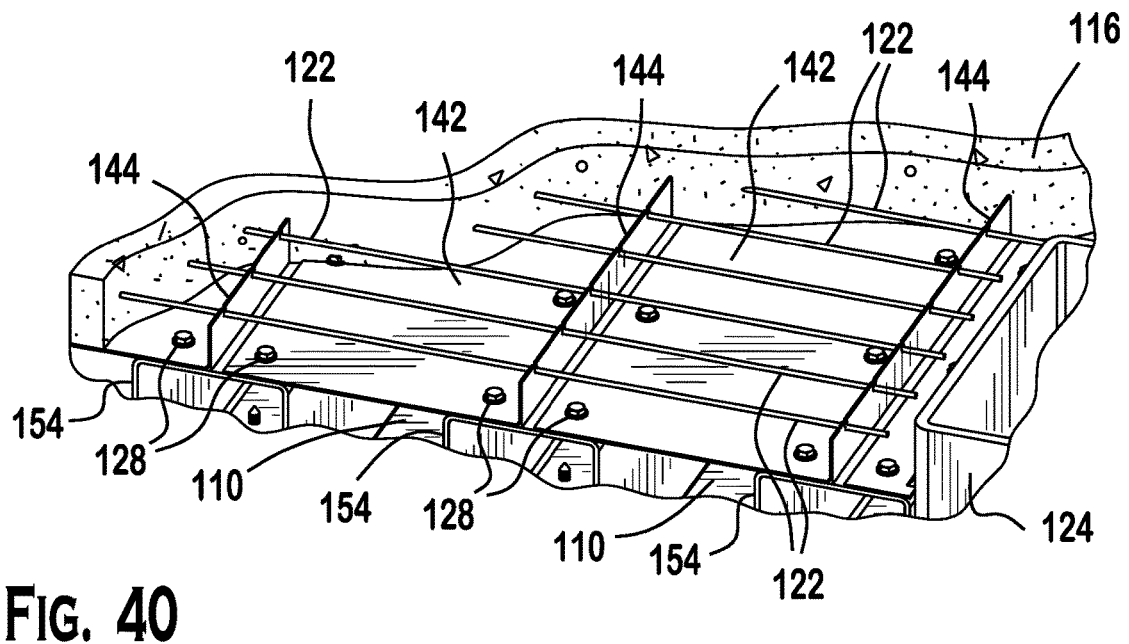

FIG. 40 is a partial cross-sectional view of an alternate preferred embodiment of the construction panel 100 in which the first plurality of anchors 114 may include a plurality of grooves 120 into which a plurality of rods 122 may be placed, to provide additional integrity to the first strengthening layer 116. Those of ordinary skill in the art will appreciate from this disclosure that the second plurality of anchors 134 may also include a plurality of grooves 120 into which a plurality of rods 122 may be placed to provide additional integrity to the second strengthening layer 136.

Figure 41:
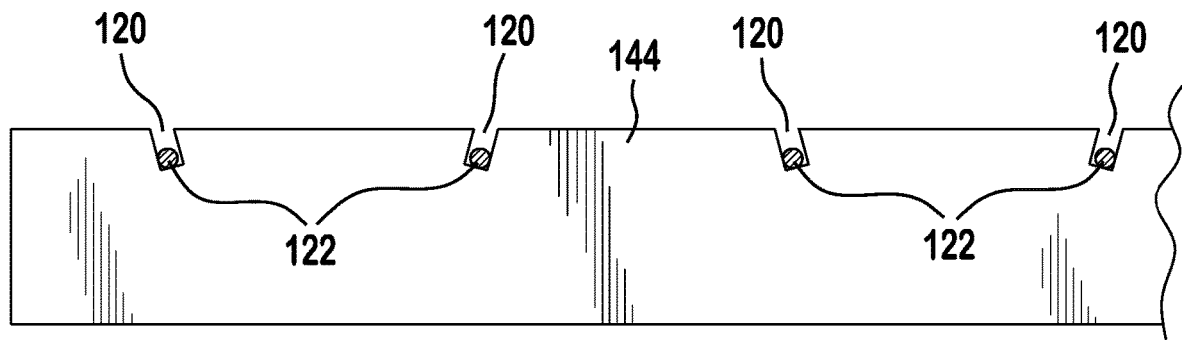

FIG. 41 is a partial right side elevational view of the first plurality of anchors 114 of FIG. 40, demonstrating that the grooves 120 are preferably cut at an angle to prevent the rods 122 from moving horizontally. Those of ordinary skill in the art will appreciate from this disclosure that the second plurality of anchors 134 may also include grooves 120 are cut at such an angle.

Figure 42:
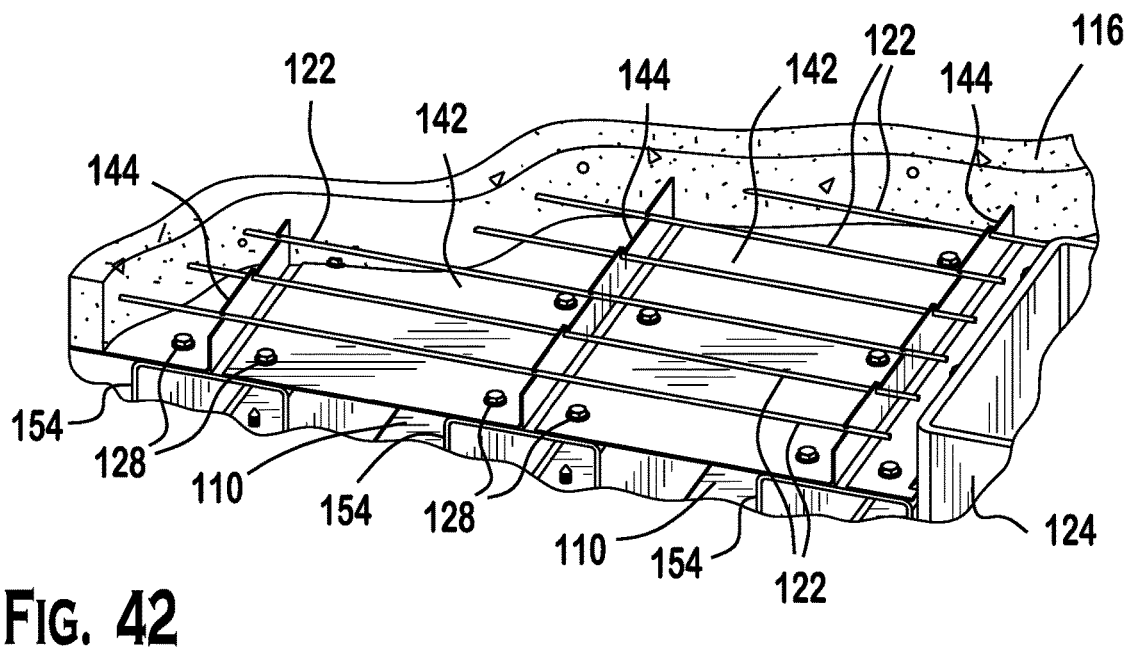

FIG. 42 is a partial cross-sectional view of an alternate preferred embodiment of the construction panel 100 of FIG. 40, in which the first plurality of anchors 114 may include a plurality of grooves 120 into which a plurality of rods 122 may be placed to provide additional integrity to the first strengthening layer 116. Those of ordinary skill in the art will appreciate from this disclosure that the second plurality of anchors 134 may also include a plurality of grooves 120 into which a plurality of rods 122 may be placed to provide additional integrity to the second strengthening layer 136.

Figure 43:
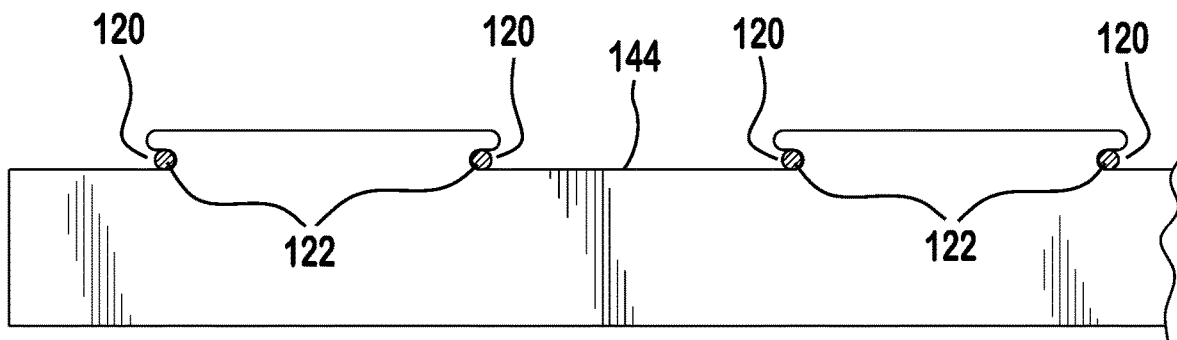

FIG. 43 is a partial right side elevational view of the first plurality of anchors 114 of FIG. 42, demonstrating that the grooves 120 are preferably cut in a curved C-shape to hold two rods 122, to prevent the rods 122 from moving vertically while limiting horizontal movement. Those of ordinary skill in the art will appreciate from this disclosure that the second plurality of anchors 134 may also include grooves 120 which are cut in a similar shape.

Figure 44:
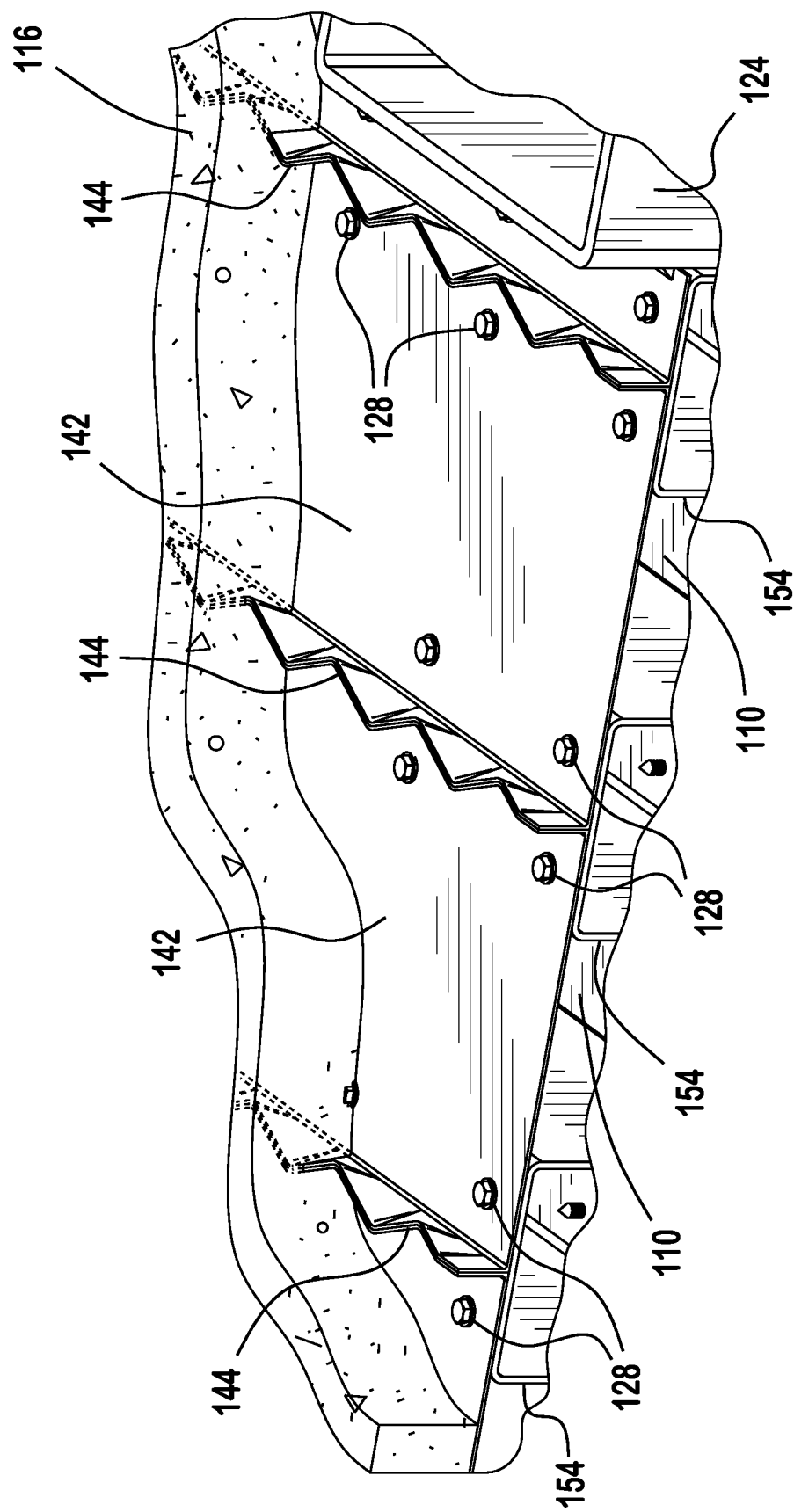

FIG. 44 is a partial cross-sectional view of a preferred embodiment of the construction panel 100 showing that the first plurality of anchors 114 may be crimped or bent. Crimping or bending of the first plurality of anchors 114 may provide additional horizontal and vertical surfaces for the first strengthening layer 116 to grip. For example, if the first strengthening layer 116 is concrete, it may flow under and around portions of the crimped anchors 114 creating more contact between the first strengthening layer 116 and the core body 108. Those of ordinary skill in the art will appreciate from this disclosure that the second plurality of anchors 134 may also be crimped.

Figure 45:
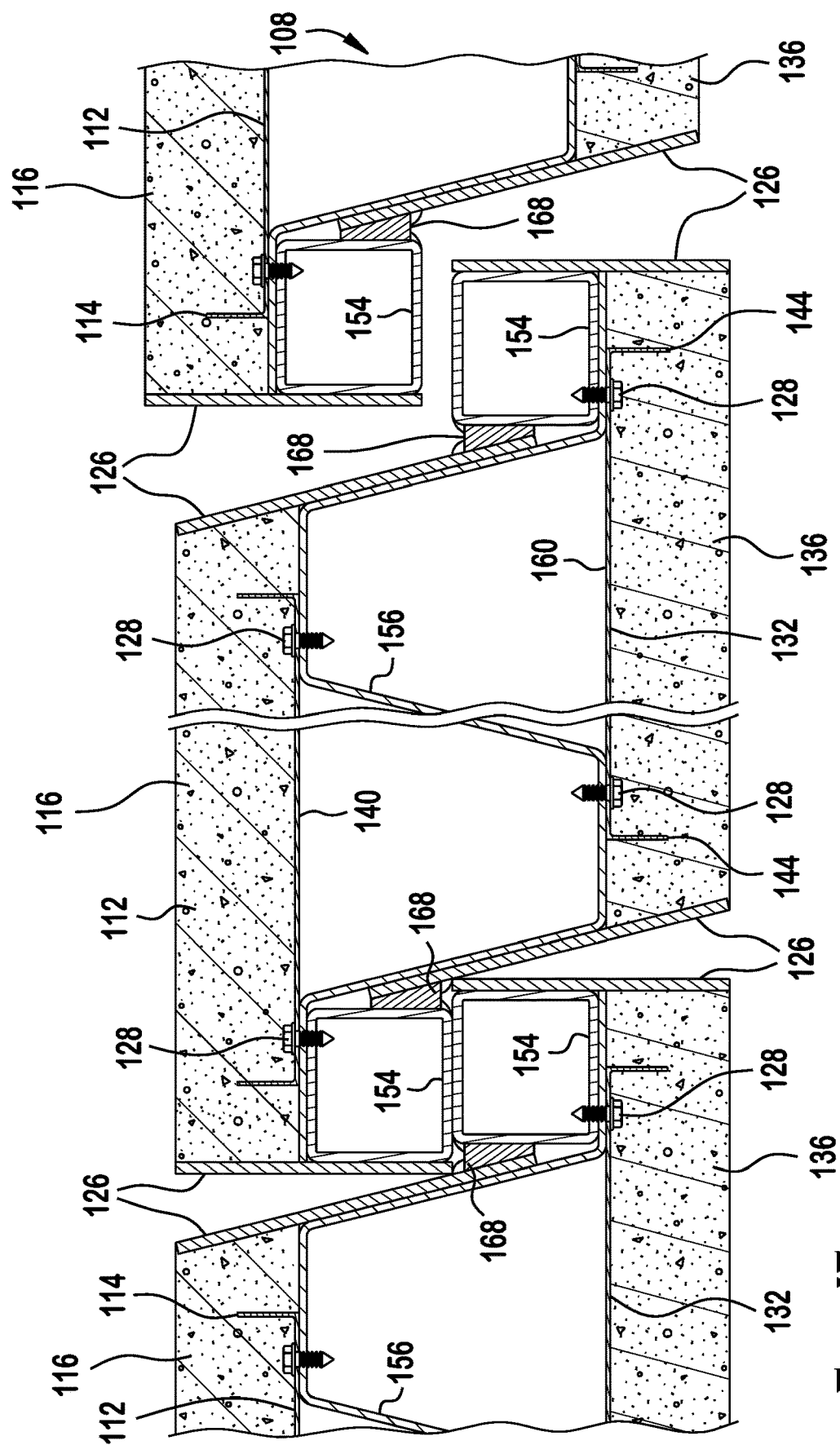

FIG. 45 is a partial cross sectional view of an additional preferred embodiment of the construction panel 100, in which the core body is formed of a corrugated support member 156 and two tubes 154 positioned at either lateral end of the corrugated support member 156. The embodiment may include additional form sides 126 positioned at angles to allow the construction panels 100 to form a shape which may interlock with other construction panels 100.

DETAILED DESCRIPTION OF THE PREFERRED EMBODIMENT

Certain terminology is used in the following description for convenience only and is not limiting. The words "right," "left," "up," and "down" designate the directions as they appear in the drawings. The words "outer" and "inner" refer to directions away from and toward, respectively, the geometric center of the construction panel. "Horizontal" and "vertical" refers to axial directions according to geometric horizontal and vertical axis of the drawing. Additionally, the words "a" and "one" are defined as including one or more of the referenced item unless specifically stated otherwise. The terminology includes the words above specifically mentioned, derivatives thereof, and words of similar import.

Referring to FIGS. 1-45, wherein like numerals indicate like elements throughout, there are shown preferred embodiments of a construction panel 100, with a construction panel being understood to mean an article for supporting construction equipment. The construction panel 100 may include mats; blocks, platforms, trestle mats, and the like. While the terms "construction panel" and "construction equipment" are used herein, these are not meant to be limiting. Those of ordinary skill in the art will appreciate from this disclosure that the invention may be used to support objects and persons for any purpose, including construction equipment, cars, trains, dump trucks, mobile and modular homes, individual persons, and any other user or object, without exceeding the scope of this disclosure.

Referring to FIGS. 1-10, preferred embodiments of the construction panel 100 may be shown in use with a crane 102. Generally speaking, crane 102 may refer to any equipment for use lifting materials. This may include large and small cranes, tower cranes, fork lifts, heavy and light industrial equipment, and more. The invention is not limited to use with construction machinery. The crane 102 may include wheels, crane feet 104, crane hooks 107, lift cables 106, a crane arm, a cabin, and the like. Preferably crane feet 104 may be extended outward on outriggers and positioned on at least one construction panel 100 to provide a base thereto. The crane 102 may also be used to lift and place construction panels to build such a base, using such crane 102 accessories as lift cables 106, lift hooks 107, crane hoops 105, and the like.

Generally, the construction panel 100 preferably comprises a core body 108 surround by first and/or second strengthening layers 116 and 136, respectively. When in use, the construction panel 100 may be placed on footers 101 or may be set directly on a surface, such as the ground, bridges, building, and the like.

Referring to FIG. 3-10, the construction panel 100 of the preferred embodiment preferably includes a core body 108. The core body 108 includes a first major surface 112 and a second major surface 132. These are preferably spaced apart and may be generally parallel to each other, thus defining a plurality of voids there between. The first major surface 112 may include a first plurality of anchors 114 disposed on its outer face which extend generally outwardly from the core body 108. The second major surface 132 may include a second plurality of anchors 134 disposed on the outer face of the second major surface 132 which extend generally outwardly from the core body 108. A first strengthening layer 116 may be positioned on the first major surface 112 of the core body 108 such that the first plurality of anchors 114 become embedded therein. Similarly, a second strengthening layer 136 may be positioned on the second major surface 132 of the core body 108 such that the second plurality of anchors 134 become embedded in the second strengthening layer 136.

The core body 108 of the construction panel 100 of a preferred embodiment preferably also includes a plurality of tubes 154 disposed between the first major surface 112 and second major surface 132 to provide support to the core body 108 to ensure a plurality of voids 110 remain between the first major surface 112 and second major surface 132. The plurality of tubes 154 are preferably generally parallel to one another, with each tube 154 preferably contacting both the first major surface 112 and second major surface 132. Preferably, the spaces between the tubes 154 form the plurality of voids 100, those spaces between the first and second major surfaces 112, 132 not occupied by materials designed to provide vertical integrity to the core body 108. In other words, the space between the first and second major surfaces 112, 132 not occupied by the tubes 154 forms the plurality of voids 110. When the tubes 154 are hollow, the space within the tubes 154 does not form a portion of the voids 110. While eight tubes 154 are shown with even spaces approximately the width of a tube inbetween, those of ordinary skill in the art will appreciate from this disclosure that any number of tubes may be provided, and with any spacing or layout.

Figure 1:
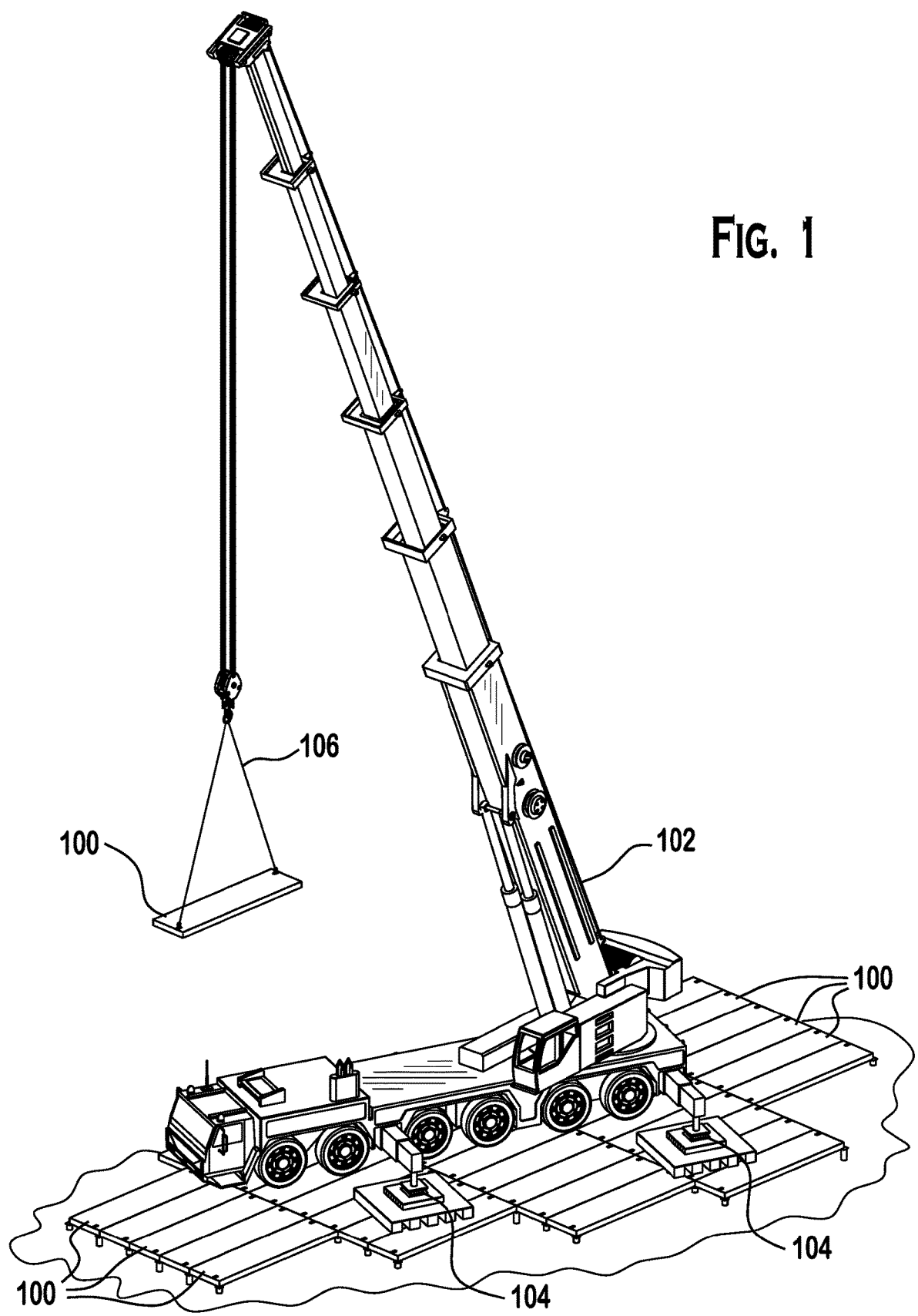
FIG. 1 is a front perspective view of a crane 102 positioned on a plurality of construction panels 100, with stabilizing crane feet 104 also positioned on construction panels 100. The figure also shows the crane 102 lifting a construction panel 100, with crane hooks 107 on a lift cable 106 being used to lift the construction panel 100.
Figure 2:
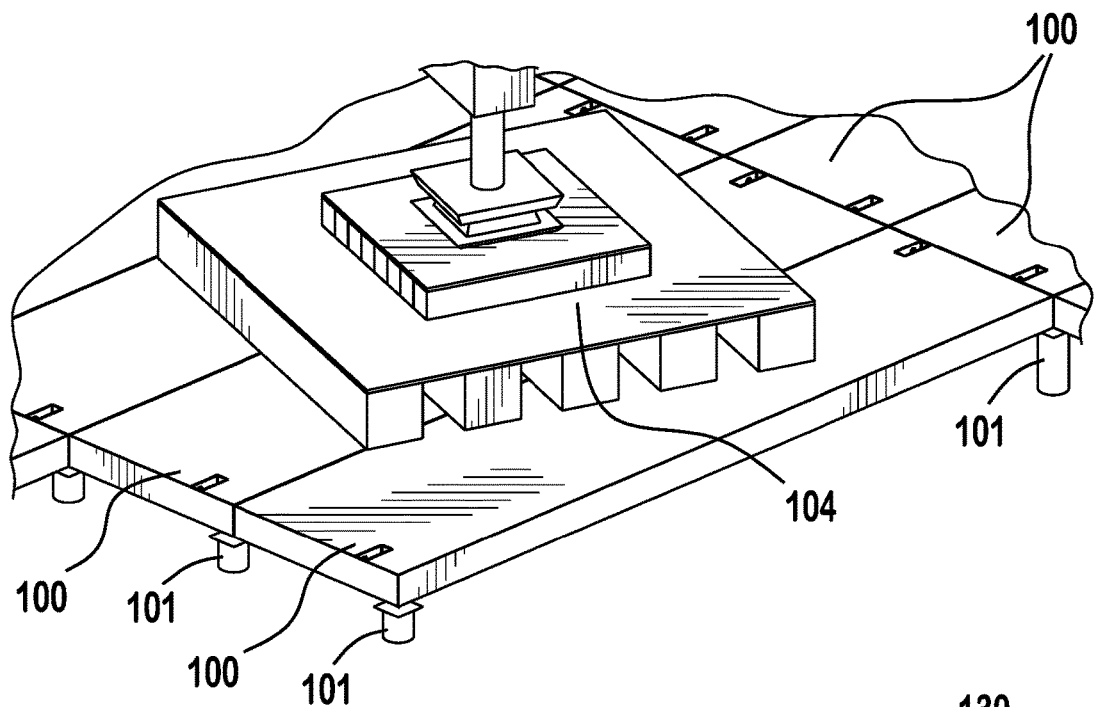
FIG. 2 is a partial front perspective view of the crane 102 and construction panels 100 of FIG. 1, providing an enhanced view of the crane feet 104 and the preferred position of the construction panels 100 in relation to one another. The figure shows a plurality of footers 101 under the construction panels 100. However, the construction panels 100 may be placed directly on other surfaces, such as the ground or other surfaces.
Figure 3:
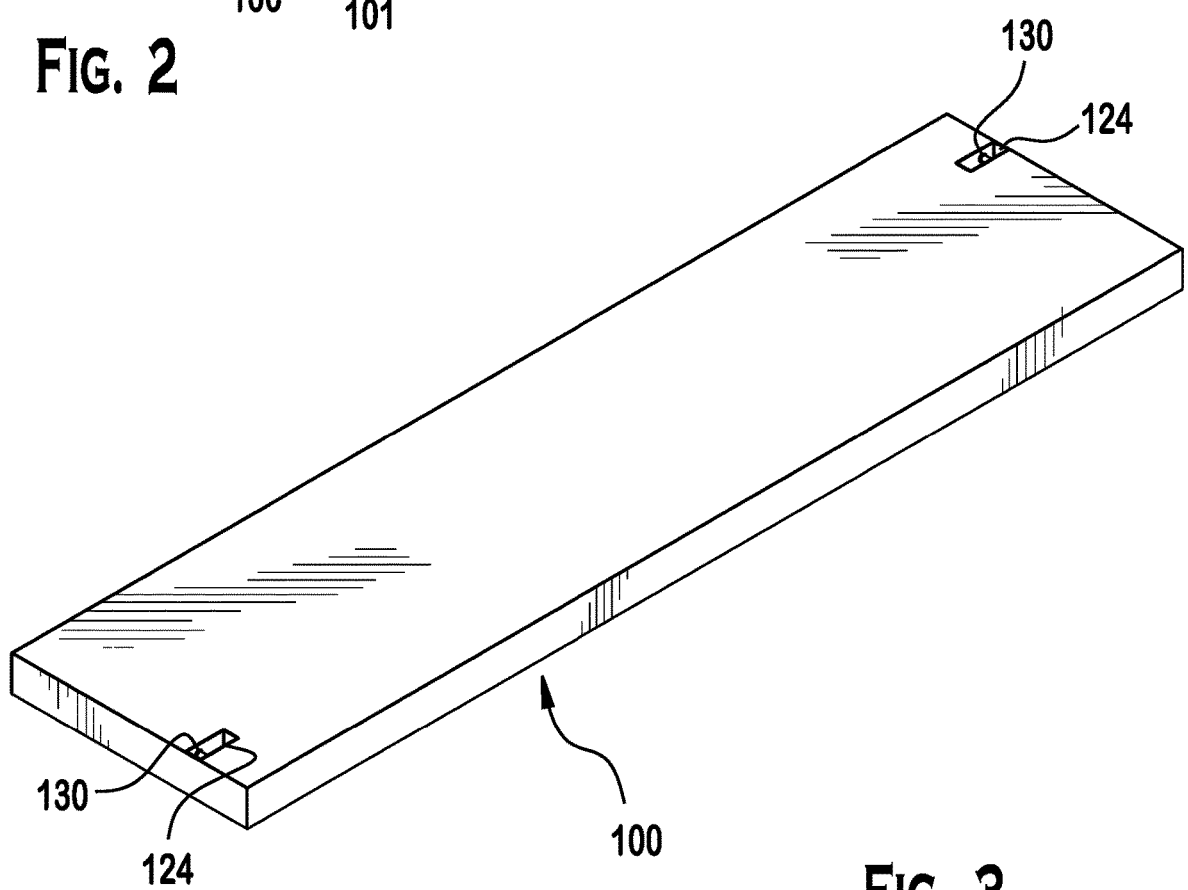
FIG. 3 is a perspective view of a construction panel 100 of a preferred embodiment. The figure depicts the preferred positioning of the tie-point boxes 124 to make the lift anchors 130 most accessible and to keep the construction panel 100 roughly horizontal when lifted.
Figure 4:
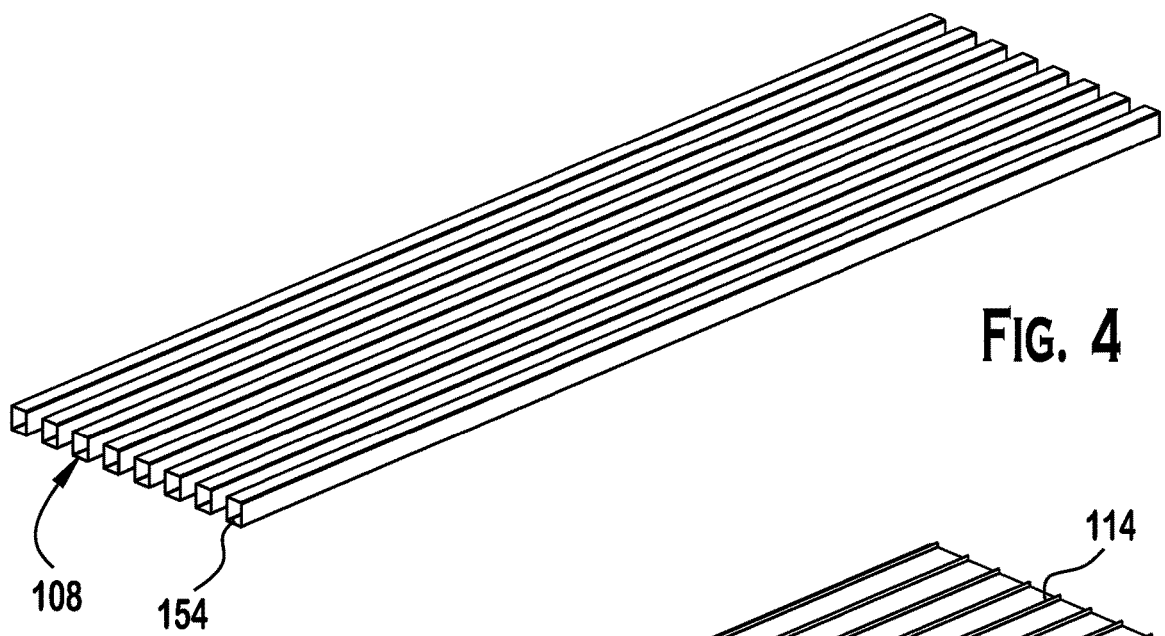
FIG. 4 is a perspective view of the plurality of tubes 154 which may be positioned in the core body 108 of a preferred embodiment of the construction panel 100. The spaces between the tubes 154 preferably form the plurality of voids 110 when the core body 108 has been constructed. The figure shows that the tubes 154 are preferably hollow, and that the tubes 154 have roughly one tube's width between them. However, those of ordinary skill in the art will appreciate from this disclosure that the tubes may be solid, and may be shaped in any preferred shape, including cylinder or rectangular prism, any may be separated by more or less space than pictured, without exceeding the scope if this disclosure. This is preferably the first step in a preferred method of manufacturing the construction panel 100.
Figure 5:
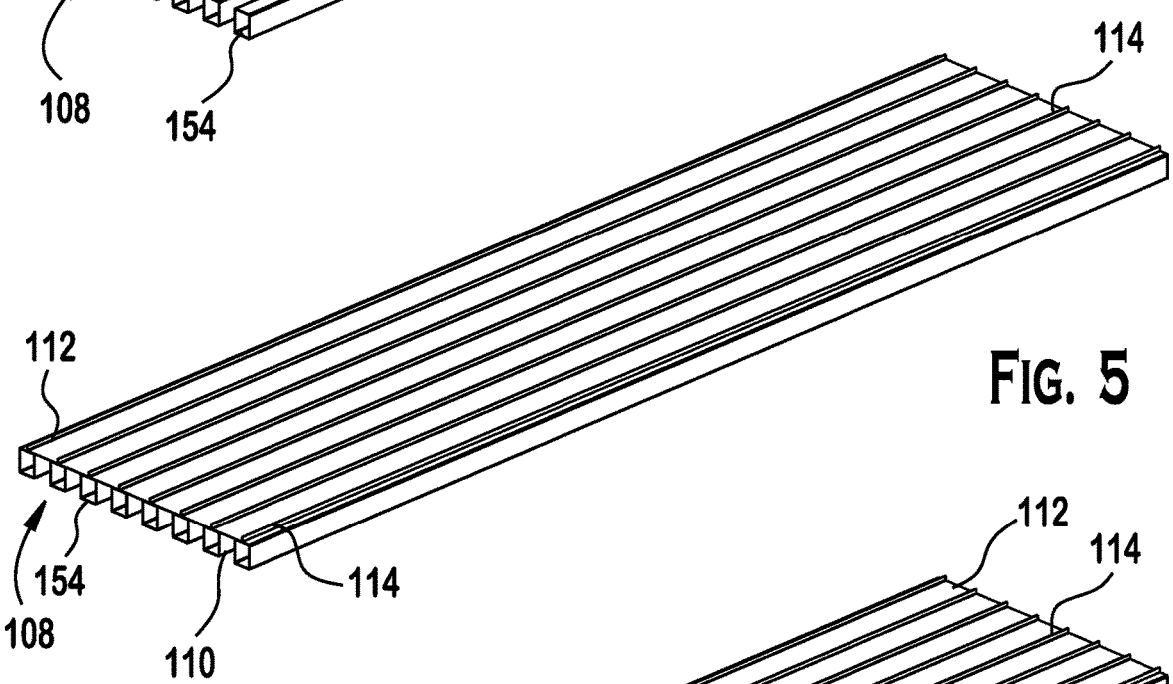
FIG. 5 is an alternate perspective view of a preferred embodiment of the construction panel 100 as shown in FIG. 4, showing the plurality of tubes 154 with first major surface 112 having been attached to the top of said tubes 154. The first plurality of anchors 114 extend generally upwards from the first major surface 112. While the first plurality of anchors 114 are show as generally straight, those of ordinary skill in the art will appreciate from this disclosure that the anchors 114 may form any suitable shape without exceeding the scope of this disclosure. In some embodiments, the first major surface 112 may be formed of a first plurality of sub-plates 140 rather than by a single plate, as shown in this figure. This is preferably the second step in a preferred method of manufacturing the construction panel 100.
Figure 6:
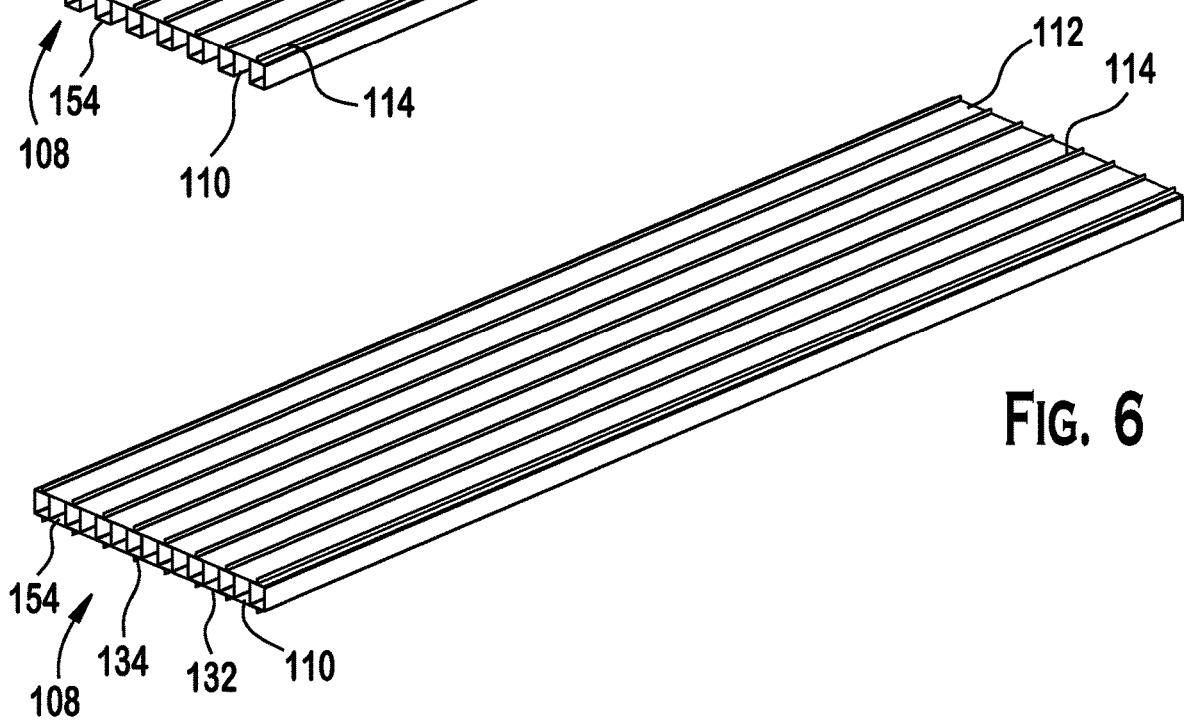
FIG. 6 is an alternate perspective view of a preferred embodiment of the construction panel 100 as shown in FIG. 5, showing the plurality of tubes 154 with first major surface 112 having been attached to the top of said tubes 154 and the second major surface 132 having been attached to the bottom of said tubes 154. The second plurality of anchors 134 extend generally downwards from the second major surface 132. While both the first plurality of anchors 114 and second plurality of anchors 134 are show as generally straight, those of ordinary skill in the art will appreciate from this disclosure that the anchors 114 and 134 may form any suitable shape without exceeding the scope of this disclosure. In some embodiments, the second major surface 132 may be formed of a second plurality of sub-plates 160 rather than by a single plate, as shown in this figure. The spaces between the tubes 154 and the first and second major surfaces 112 and 132, respectively, may form the plurality of voids 110. This is preferably the third step in a preferred method of manufacturing the construction panel 100.
Figure 7:
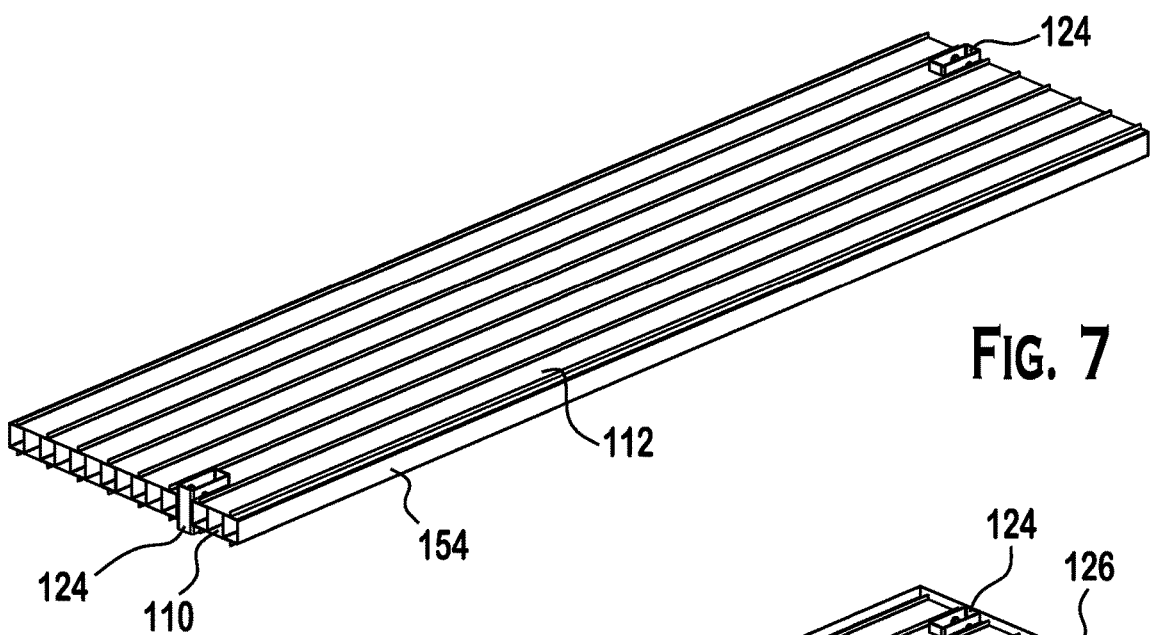
FIG. 7 is an alternate perspective view of a preferred embodiment of the construction panel 100 as shown in FIG. 6, showing the preferred placement of tie-point boxes 124 in the core body 108, preferably in of the plurality of voids 110 proximate to separate ends of the core body 108. Though two tie-point boxes 124 are preferred, those of ordinary skill in the art will appreciate from this disclosure that any number of tie-point boxes 124 may be provided.
Figure 8:
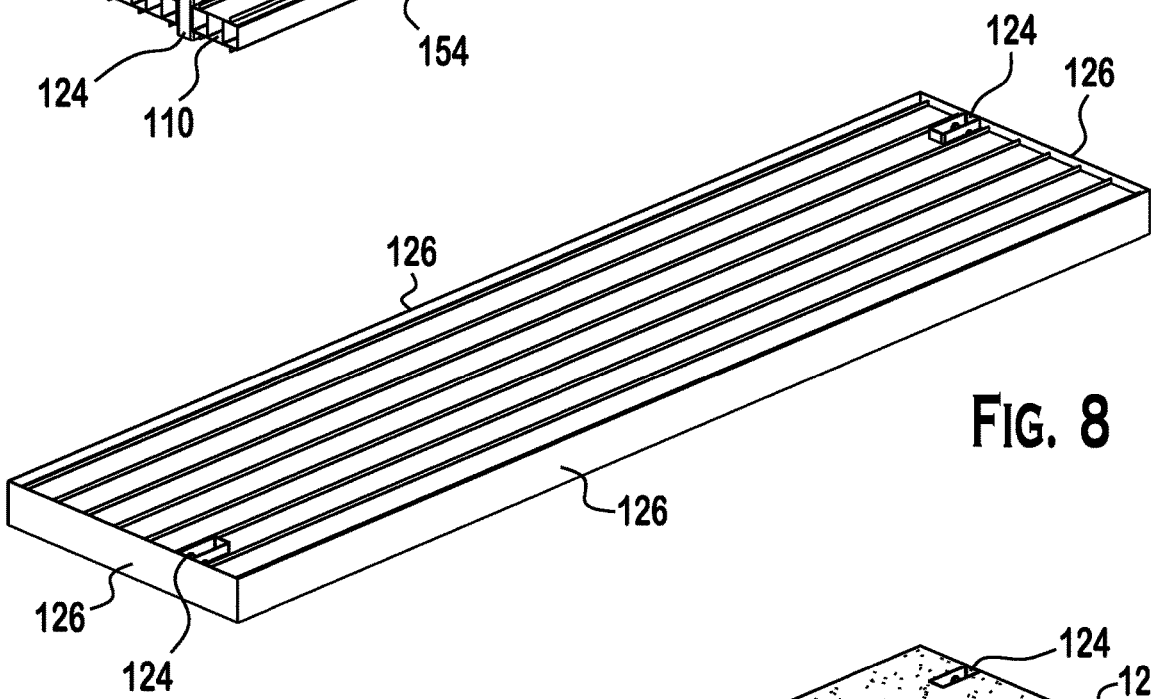
FIG. 8 is an alternate perspective view of a preferred embodiment of the construction panel 100 as shown in FIG. 7, showing the core body 108 with form sides 126 having been attached the entire perimeter of the core body 108. The form sides 126 preferably extend outward from the center of the core body 108 such that the form sides 126 extend away from the first major surface 112 and second major surface 132 farther than the first plurality of anchors 114 and second plurality of anchors 134 respectively. It is also preferred that the form sides 126 not extend away from the first major surface 112 and second major surface 132 farther than the tie-point boxes 124, to ensure that the passage 164 will not be covered by first or second strengthening layers 116, 136. This is preferably the fourth step in a preferred method of manufacturing the construction panel 100.
Figure 9:
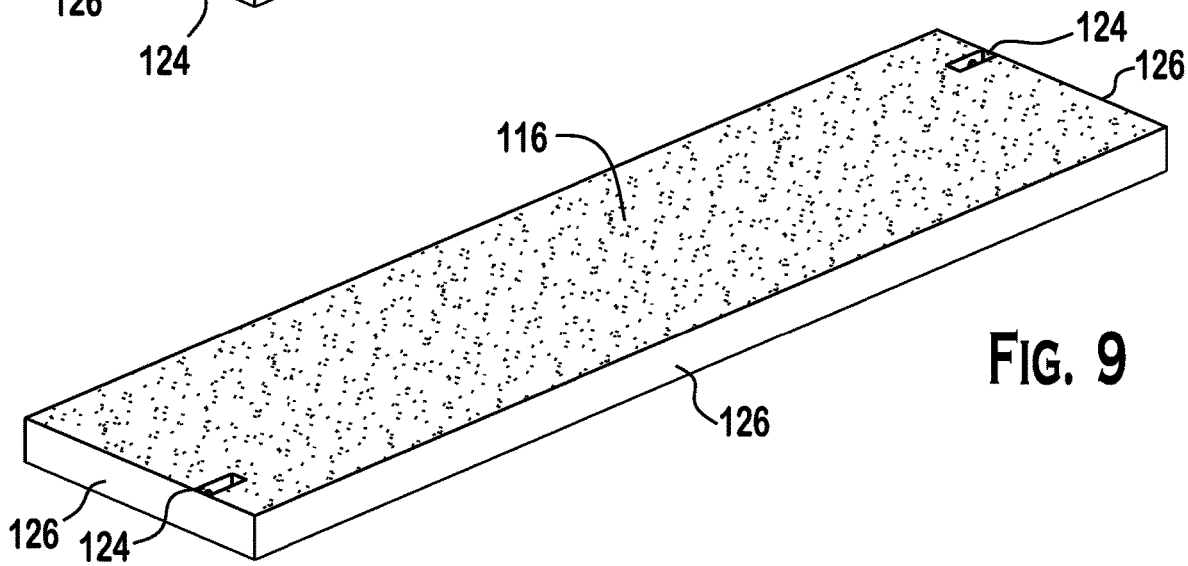
FIG. 9 is an alternate perspective view of a preferred embodiment of the construction panel 100 as shown in FIG. 8, in which a first strengthening layer 116, such as concrete, has been poured onto the first major surface 112 and held in place by the form sides 126. Preferably, a second strengthening layer 136 has also been poured onto the second major surface 132 and also held in place but the form sides 126 (preferably while the construction panel 100 was inverted). Such a configuration provides strong support, but the generally hollow core may reduce weight. The pouring of the first and second strengthening layers 116, 136 are preferably the sixth and fifth steps, respectively, in a preferred method of manufacturing the construction panel 100.
Figure 10:
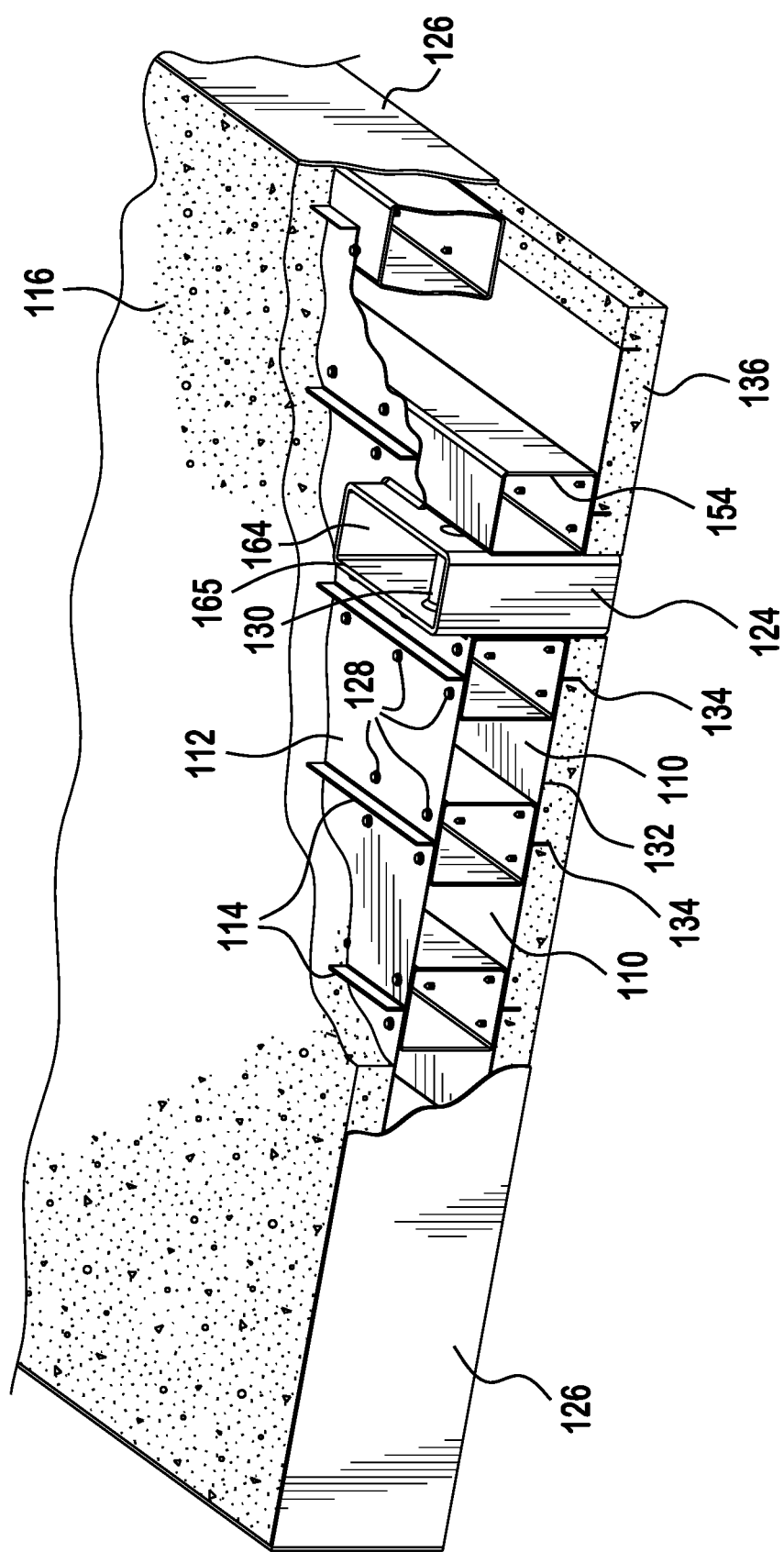
FIG. 10 is partial cross-sectional view of the construction panel 100 of FIG. 9, showing how the first plurality of anchors 114 and second plurality of anchors 134 extend into the first strengthening layer 116 and second strengthening layer 136 respectively, proving greater stability to the respective strengthening layers. The figure also shows that the first major surface 112 may be formed of a first plurality of sub-plates 140, and the second major surface 132 may be formed of a second plurality of sub-plates 160. These sub-plates may be affixed to one or more of the tubes by a plurality of fasteners 128.
Figure 13:
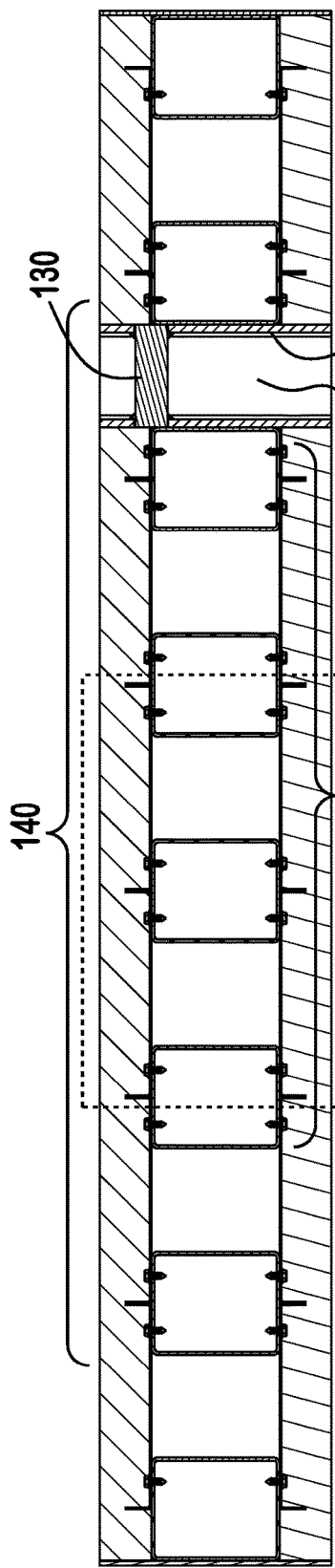
FIG. 13 is a cross-sectional view of the construction panel 100 of a preferred embodiment, showing that the passage 164 may extend fully through the entire width of the core body 108. The figure further demonstrates that the first major surface 112 may be formed of a first plurality of sub-plates 140 and the second major surface 132 may be formed of a second plurality of sub-plates 160. Those of ordinary skill in the art will appreciate from this disclosure that either or both of the first and second major sides 112, 132 may be formed of sub-plates without exceeding the scope of this disclosure.
Figure 14:
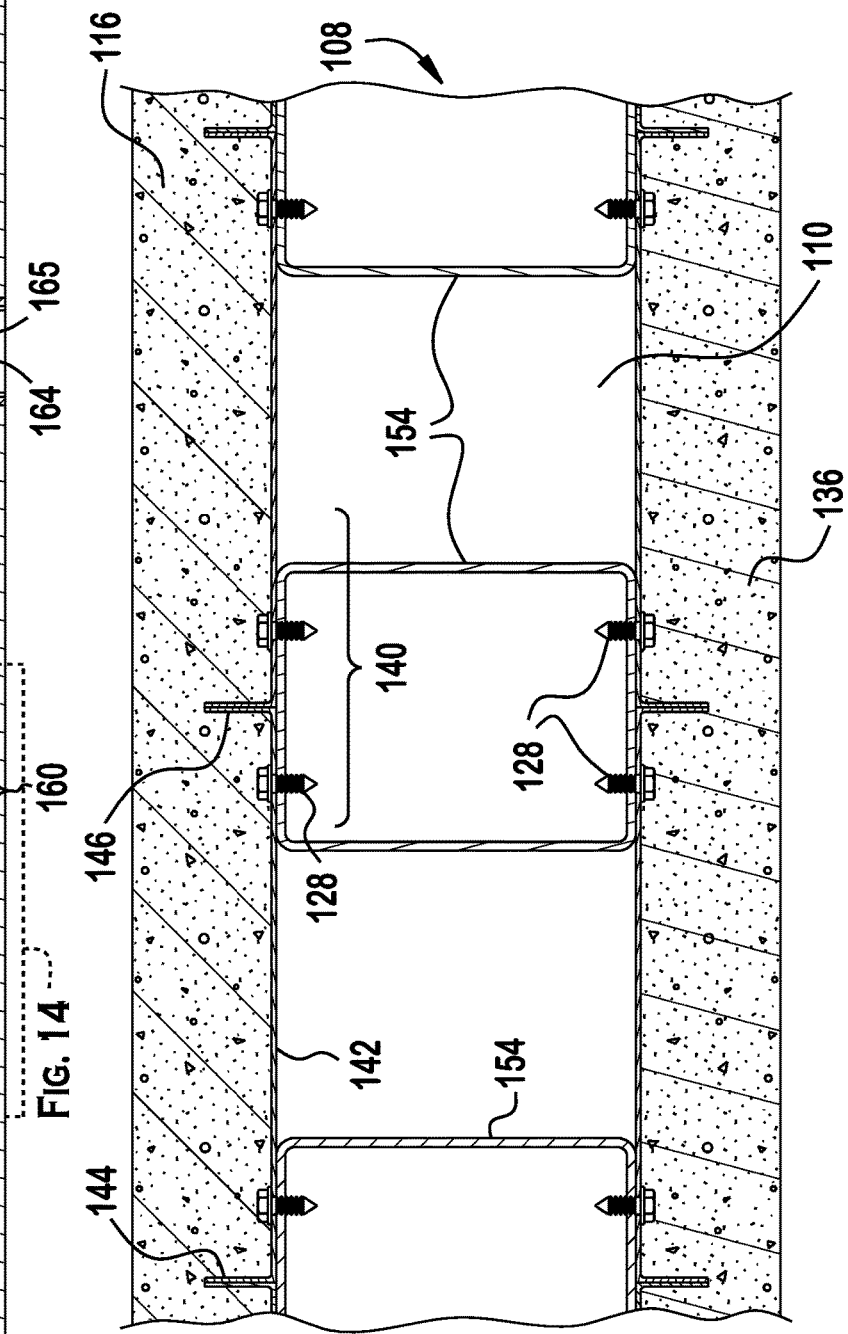
FIG. 14 is a cross-sectional view of the construction panel 100 of FIG. 13 as taken along the dashed lines in FIG. 13. The figure shows that the first plurality of sub-plates 140 preferably each include a first flange section 144, a second flange section 146, and a base section 142. It is further preferred that each of the first plurality of sub-plates 140 be attached to at least two of the plurality of tubes 154 via a plurality of fasteners 128, preferably driven through a portion of the base section 142 of each sub-plate 140. Those of ordinary skill in the art will appreciate from this disclosure that the second plurality of sub-plates 160 may be similar or identical in shape or size as the first plurality of sub-plates 140, each preferably having include a first flange section 144, a second flange section 146, a base section 142, and attached to at least two of the plurality of tubes 154 via a plurality of fasteners 128.
Figure 15:
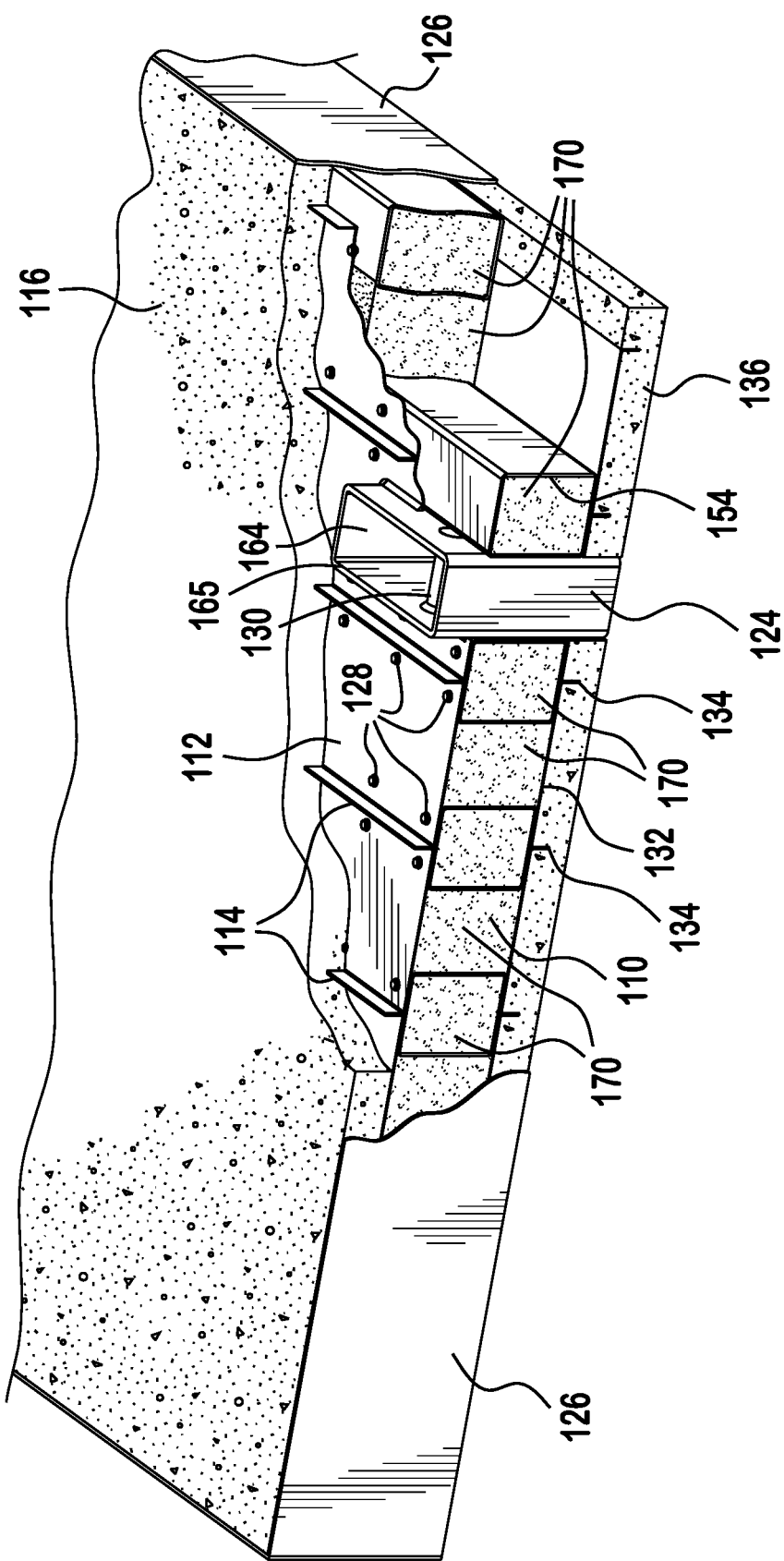
FIG. 15 is partial cross-sectional view of the construction panel 100 of FIG. 14, further demonstrating that insulation 170 may preferably be included in both the plurality of tubes 154 showing that the plurality of tubes 154 and/or the spaces therebetween may be filled with insulation 170 to increase stability without significantly increasing weight. The plurality of tubes 154 may include insulation 170 therein prior to building the core body 108, and insulation 170 may be placed between the tubes 154 before the first and second major surfaces 112, 132 are attached. Alternatively, insulation 170 may be sprayed into the core body 108 after the core body 108 has been constructed and before all form sides 126 have been attached. The plurality of voids 110 may also be formed of insulation 170.
Figure 19:
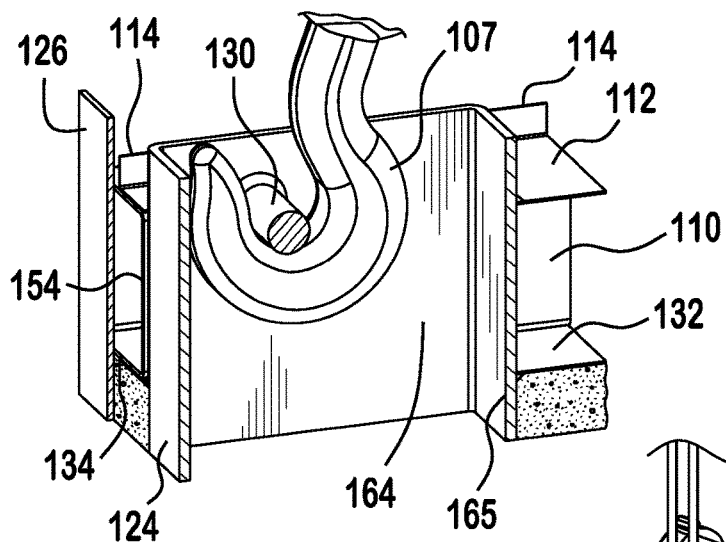
FIG. 19 is cross-sectional view of the tie-point box 124 of the construction panel 100 of FIG. 18, showing that the lift anchor 130 may be directly affixed to the perimeter sidewall 165. The perimeter sidewall 165 is preferably directly welded to the first and second major surfaces 112 and 132 and one of the plurality of tubes 154 with a plurality of welds 168.
Figure 18:
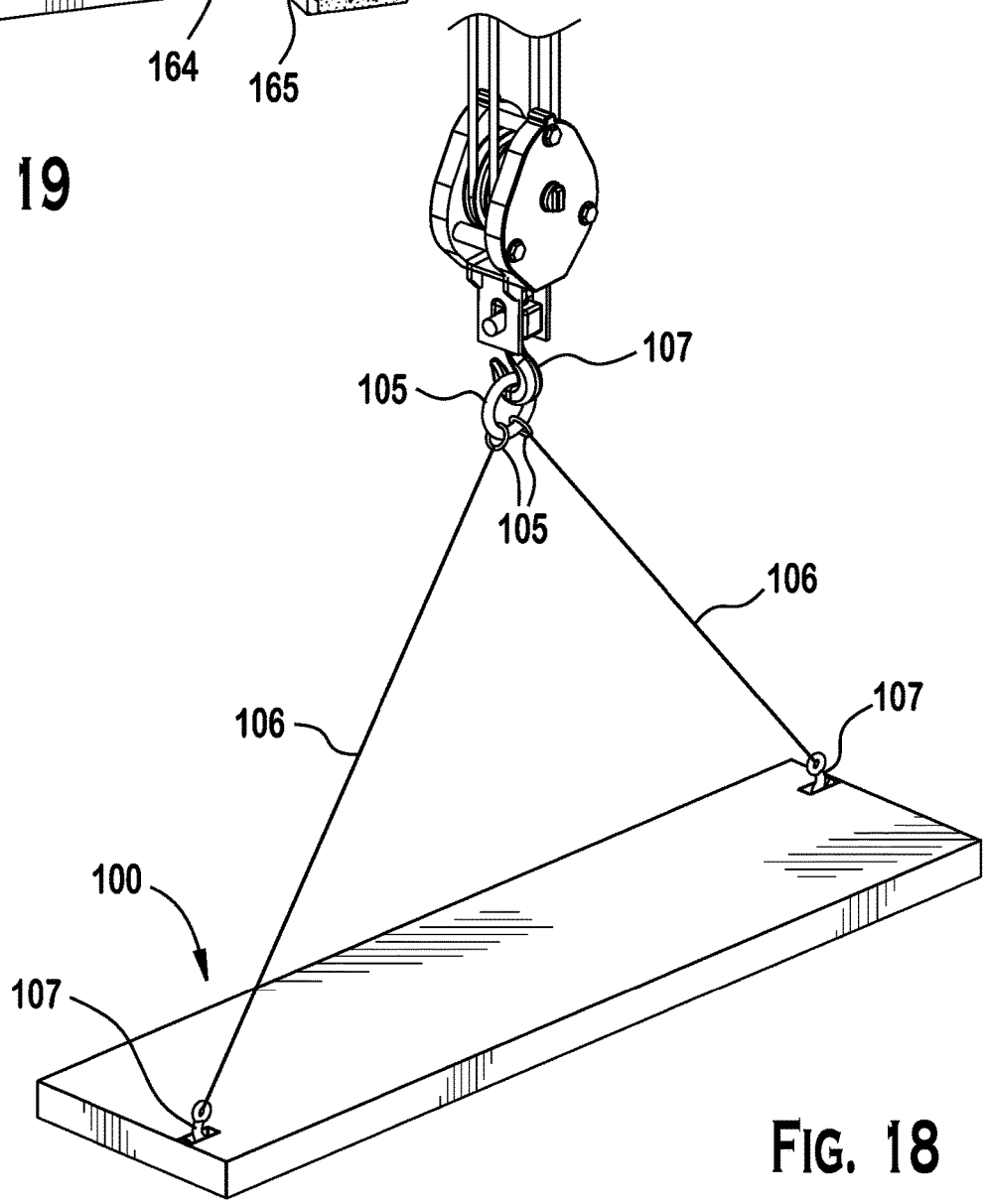
FIG. 18 is a perspective view of a preferred embodiment of the construction panel 100 being lifted by a crane 102. Crane hooks 107 are hooked around the lift anchors 130 and connected to a lift cable 106 and crane hoops 105 to facilitate lifting.
Figure 20:
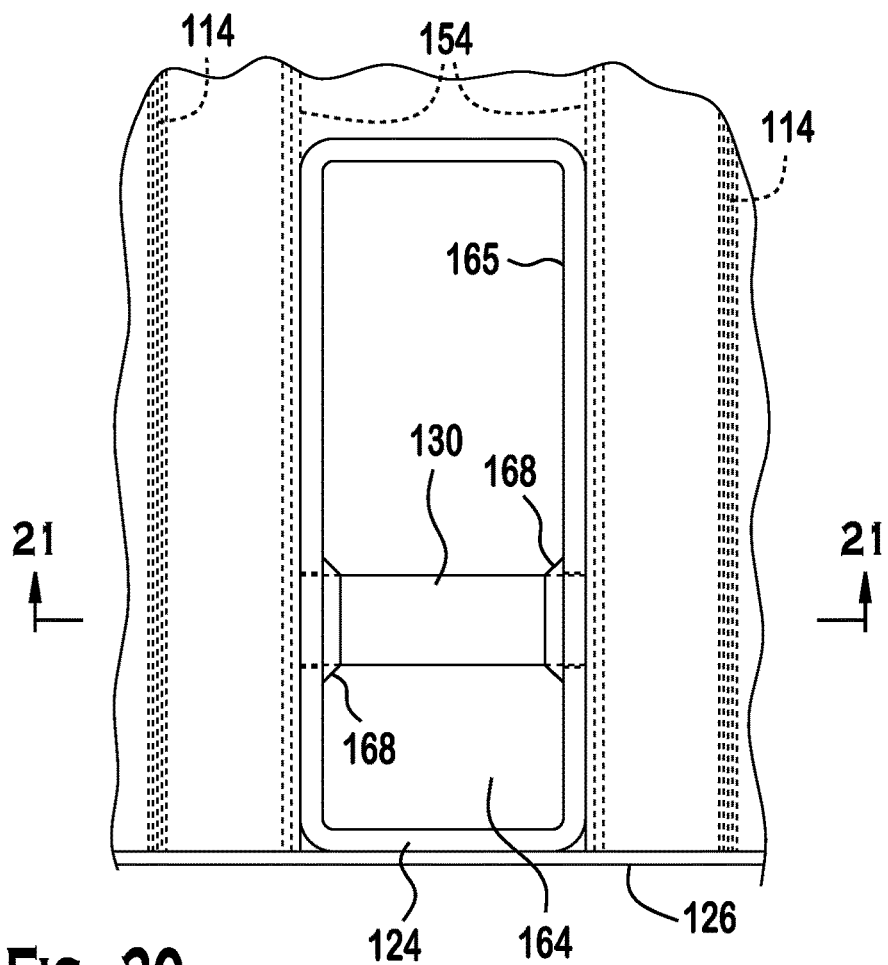
FIG. 20 is a partial plan view of the construction panel 100 of FIG. 18, showing that in the preferred embodiment, the lift anchor 130 preferably extends partially though the perimeter sidewall 165 to provide additional strength to the lift anchor 130. The preferably allows the lift anchors 130 to support the weight of the construction panel 100 when lifted.
Figure 21:
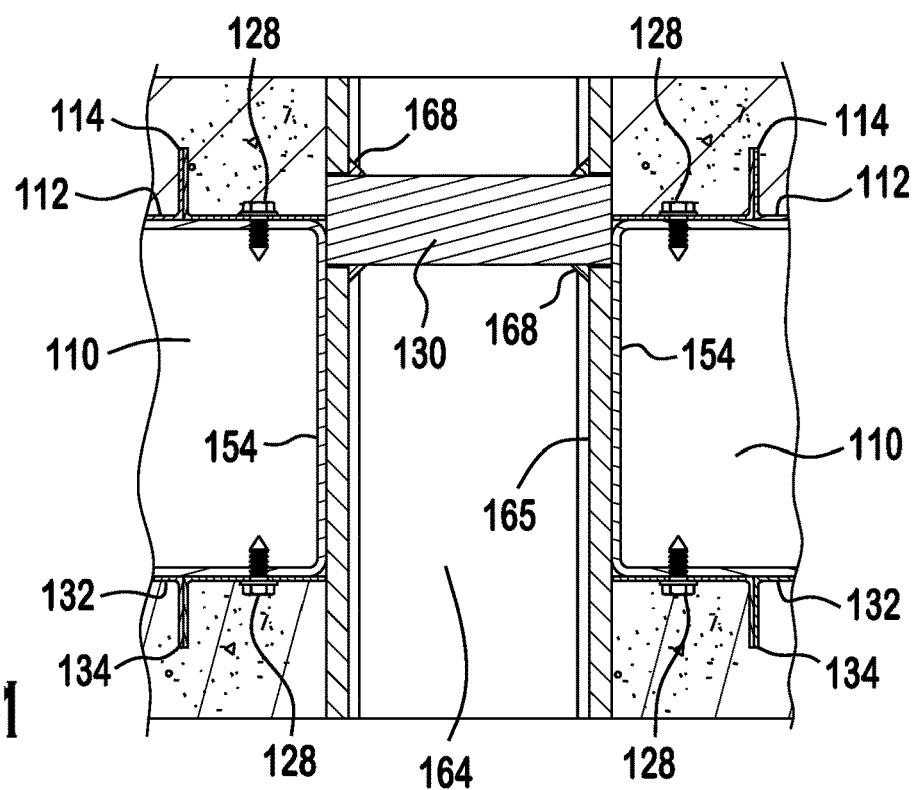
FIG. 21 is a cross section of the construction panel 100 as taken along lines 21-21 of FIG. 20, showing the welds 168 that preferably further secure the lift anchor 130 to the perimeter sidewall 165.
Figure 24:
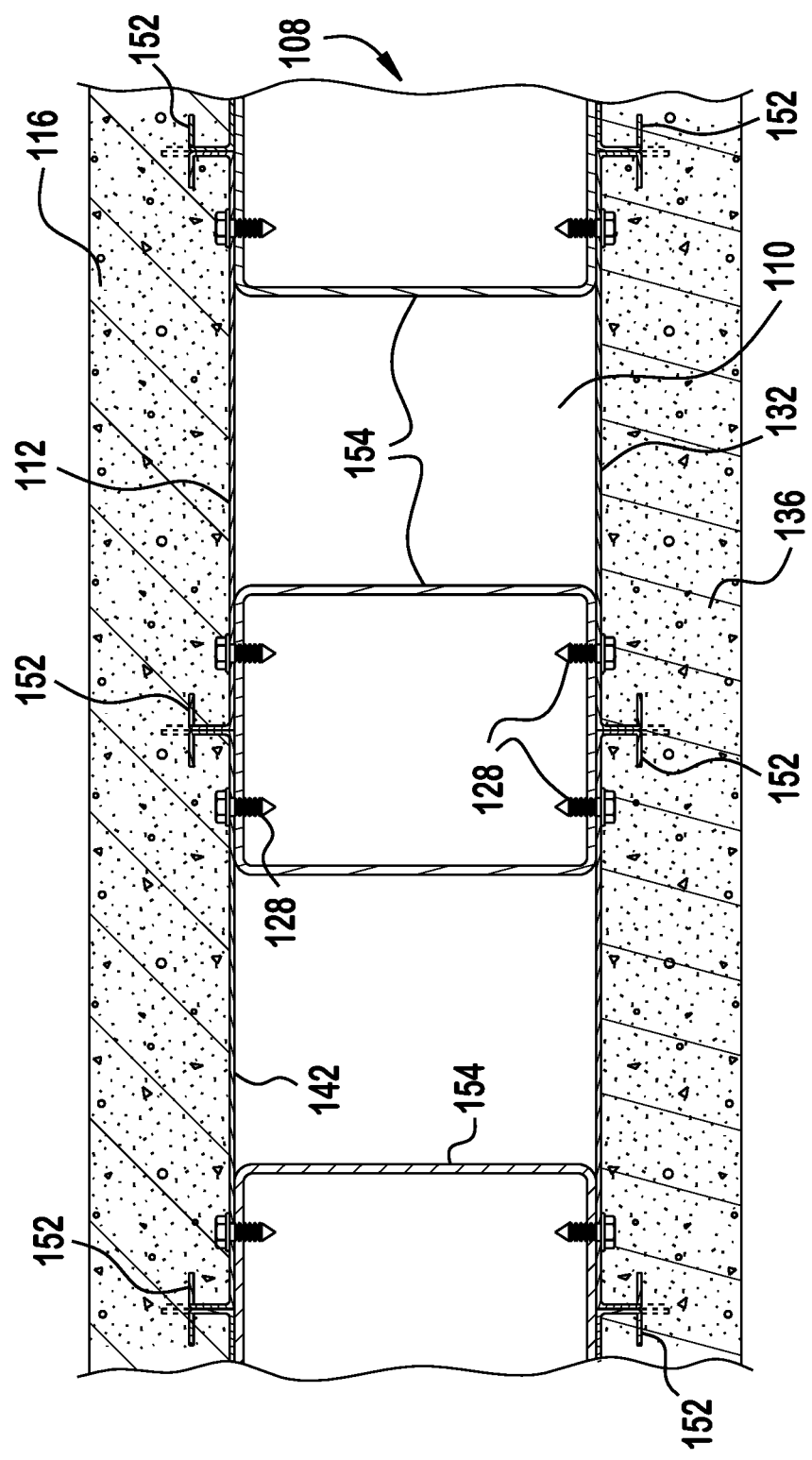
FIG. 24 is partial cross-sectional view of the construction panel 100 of a preferred embodiment, showing the preferred positioning of the first plurality of anchors 114 and second plurality of anchors 134 is above and below each tube, respectively, to better show the preferred configuration of the flaps 152.

Referring to FIGS. 15-17, in some embodiments the voids 110 and/or hollow portions of the tubes 154 may be fully or partially filled with a material, such as foam or spray insulation 170. The insulation may be provided before, during, or after a portion of the core body 108 has been constructed. In such embodiments, the insulation 170 preferably provides no support to the vertical integrity of the core body 108, and thus the insulation 170 in the spaces between the tubes 154 may form the voids 110. Those of ordinary skill in the art will appreciate from this disclosure that insulation 170 may be provide in any embodiment, including embodiments without tubes 154, without exceeding the scope of this disclosure.

In an alternate preferred embodiment, as in FIG. 36, a plurality of beams 162 may be provided between the first major surface 112 and the second major surface 132 instead of, or in addition to, the plurality of tubes 154 to provide vertical rigidity to the core body 108. In some preferred embodiments, the plurality of beams 162 may each have a C-shape, preferably roughly formed with two 90 degree corners. In other preferred embodiments, the plurality of beams 162 may have an I-shape. Some combination of I-shaped beams and C-shaped beams may also be provided. It is further preferred that each of the plurality of beams 162 contact both the first major surface 112 and the second major surface 132.

Referring to FIGS. 33-35, in an alternate preferred embodiment, a corrugated support member 156 may be provided between the first major surface 112 and the second major surface 132 instead of, or in addition to, the plurality of tubes 152 to provide vertical rigidity to the core body 108. Generally speaking, the corrugated support member 156 may be said to be corrugated in shape because it forms alternating areas of ridges and depressions. It is preferred that each ridge and depression contact at least one of the first major surface 112 and the second major surface 132. In one preferred embodiment, the corrugated support member 156, when viewed in cross section, may have the shape of a square sine wave. In another preferred embodiment, the corrugated support member 156, when viewed in cross section, may have the shape of a trapezoidal sine wave. Those of ordinary skill in the art will appreciate from this disclosure that any suitable shape may be provided for corrugated support member 156. The corrugated support member 156 may be formed of two or more of a plurality of sub-members 158, which may or may not overlap one another. It is preferred that each of the sub-members contact both the first major surface 112 and the second major surface 132. In a preferred embodiment, each sub-member 158 forms three horizontal portions and two vertical portions. However, those of ordinary skill in the art will appreciate from this disclosure that the sub-members 158 may form any portion of the corrugated support member 156 of any shape, including diagonal sides, without exceeding the scope of this disclosure. It is preferred that adjacent, overlapping sub-members 158 be secured to the first major surface 112 via a plurality of fasteners 128 that each extend through the first major surface 112 and through each of the adjacent sub-members 158 at overlapping points. It is also preferred that the each of the first plurality of sub-members 158 be secured to the second major surface 132 via fasteners 128 that extend through the second major surfaces 132 and only that sub-member 158. However, those of ordinary skill in the art will appreciate from this disclosure that the sub-members 158 may be affixed to either major surface 112, 132 in any described way without exceeding the scope of this disclosure.

It is preferred that the plurality of tubes 154, plurality of beams 162, corrugated support member 156, and plurality of sub-members 158 all be formed of suitably strong materials which can support a crane 102 and the first and second strengthening layers 116, 136. Preferably, these are formed of steel, iron, aluminum, alloy, and polyvinyl chloride. However, those or ordinary skill in the art will appreciate from this disclosure that these elements may be formed of any suitable material, including titanium and synthetic materials, without exceeding the scope of this disclosure.

Referring to FIGS. 10-14 and 22-24, the construction panel 100 preferably includes a first strengthening layer 116 on the first major surface 112 of the core body 108 and a second strengthening layer 136 on the second major surface 132 of the core body 108. It is preferred that the first and second strengthening layers 116, 136 are formed of suitably hard and heavy materials which may form solid and strong base for construction equipment. Preferred materials for forming the first and second strengthening layers 116, 136 include concrete, fiber reinforced concrete, cement, epoxy, asphalt, and cellular concrete. However, those or ordinary skill in the art will appreciate from this disclosure that these elements may be formed of any suitable material without exceeding the scope of this disclosure. The construction panel 100 preferably also includes form sides 126 along the outer perimeter of the core body 100 and extending further from the first or second major surfaces 112, 132 as the first plurality of anchors 114 or second plurality of anchors 134, respectively. The form sides 126 are preferably configured to allow a hardening liquid, such as concrete, to be poured onto either of the first or second major surfaces 112, 132 without running over the edges. Thus the concrete would remain on the first or second major surfaces 112, 132 and harden into the first or second strengthening layers 116, 136.

Referring to FIG. 39, it may be preferable to include a plurality of strengthening layer grooves 166, or grooves in the strengthening layer, in either or both of the first and second strengthening layers 116, 136. The strengthening layer grooves 166 may help to provide crack control to the first and second strengthening layers 116, 136.

Referring to FIGS. 5-14 and 44, a first plurality of anchors 114 are preferably disposed on the first major surface 112 and extend generally outward from the core body 108. The first plurality anchors 114 are preferably formed of the same materials as the first major surface 112. In some preferred embodiments, each of the first plurality of anchors 114 are formed of at least one of a first flange section 144 or a second flange section 146 of a one of a first plurality of sub-plates 140 forming the first major surface 112. Similarly, a second plurality of anchors 134 is preferably disposed on the second major surface 132 and extend generally outward from the core body. The second plurality anchors 134 are preferably formed of the same materials as the second major surface 132. In some preferred embodiments, each of the second plurality of anchors 134 are formed of at least one of a first flange section 144 or a second flange section 146 of a one of a second plurality of sub-plates 160 forming the second major surface 132. The first and second plurality of anchors 114, 134 are configured to provide a greater surface area for the first and second strengthening layers 116, 136 to adhere to, ensuring that the first and second strengthening layers 116, 136 are firmly connected to the core body 108.

In some preferred embodiments, the first and second plurality of anchors 114, 134 are preferably straight and are positioned generally above one or below one of the first plurality of tubes 154. Thus in a preferred embodiment, there are the same number of anchors per major surface as there are tubes 154 in the core body 108. Those of ordinary skill in the art will appreciate from this disclosure that any number of anchors may be provided, with any spacing or layout, and in any suitable shape, without exceeding the scope of this disclosure. For example, in FIG. 44, it may be seen that the first plurality of anchors 114 are crimped, having a plurality of crimped section, rather than being generally straight.

Referring to FIGS. 22-24 and 37-43, the first and second plurality of anchors 114, 134 may include additional elements to increase the connection between the core body 108 and the first and second strengthening layers 116, 136, while also provide additional lateral rigidity to the strengthening layers 116, 136. In one preferred embodiment, the first plurality of anchors 114 may include a plurality of cut-outs 150 and a plurality of flaps 152, preferably provided in alternating fashion. These flaps 152 and cut-outs 150 provide additional crevices and surface area for the first strengthening layer 116 to fit into (particularly if its formed of concrete, which may flow therein when it is wet and then harden) to provide strength when pushed in various directions. Those of ordinary skill in the art will appreciate from this disclosure that the second plurality of anchors 134 may also include flaps 152 and cut-outs 150 to better secure the second strengthening layer 136 to the core body 108.

In a separate preferred embodiment, a first mesh 118, also called a mesh 118, may be provided to be embedded in the first strengthening layer 116. The mesh 118 may be attached to some or all of the first plurality of anchors 114 in some preferred embodiments, or may be set atop but not attached to some or all of the first plurality of anchors 114 in other preferred embodiments. The second plurality of anchors 134 may be configured to engage a second mesh 119 in the same manner, such that the second mesh 119 may be embedded in the second strengthening layer 136.

The first plurality of anchors 114 may, in another preferred embodiment, include a plurality of grooves 120 therein into which each of a plurality of rods 122 may be placed to run perpendicular to the tubes 154 and be embedded in the first strengthening layer 116. In embodiments in which the first plurality of anchors 114 is formed on at least one of the first flange section 144 or second flange section 146 of one of the first plurality of sub-plates 140, flange section 144 or 146 of at least some of the first plurality of sub-plates 140 define the plurality of grooves 120 into which the plurality of rods 122 may be located. The grooves 120 may preferably be cut at an angle (and most preferably, at a 45 degree angle relative to the bottom of the anchor) to prevent the rods 122 from moving horizontally once placed. Alternatively, the grooves 120 may be cut in a curved C-shape to hold two rods 122 opposite one another, which may prevent the rods 122 from moving vertically while also limiting horizontal movement once placed. Those of ordinary skill in the art will appreciate from this disclosure that the second plurality of anchors 134 and second plurality of sub-plates 160 may define grooves 120 and secure rods 122 in the same manner to embed the rods 122 in the second strengthening layer 136. Those of ordinary skill in the art will appreciate from this disclosure that the second plurality of anchors 134 may also include grooves 120 which are cut in a similar shape.

Referring to FIGS. 13-14 and 29-32, the first major surface 112 of the core body 108 may include a first plurality of sub-plates 140. The first major surface 112 be formed solely by a first plurality of sub-plates 140, or at least some of the first major surface 112 may be formed by a portion of the tubes 154, plurality of beams 162, or corrugated support member 156. The first plurality of sub-plates 140 of a preferred embodiment may each have an L-shape, with each having a base section 142 and a flange section 144 (also referred to as a first flange section 144) which extends generally perpendicularly to the base section 142. The first plurality of sub-plates 140 may be positioned generally side-by-side with an overlap between the base sections 142 of adjacent sub-plates 140 allowing the sub-plates 140 to form the entirety of the first major surface 112. Additionally, it is preferred that the plurality of fasteners 128 be arranged in a row with each fastened through the base section 142 of two sub-plates and into one of the plurality of tubes 152. This overlap allows each fastener 128 to pass through two sub-plates 140 rather than one, and into one of the plurality of tubes 154. In other embodiments, the plurality of fasteners 128 are preferably arranged in a row and fastened through the base sections 142 of two sub-plates 140 and into one of the plurality of beams 162. The flange sections 144 of at least some of the first plurality of sub-plates 140 may form the first plurality of anchors 114.

In a separate preferred embodiment, the first plurality of sub-plates 140 forming the first major surface 112 may each have a U-shape when viewed in cross section. In such an embodiment, each sub-plate 140 may include a base section 142, a first flange section 144, and second flange sections 146, with the flange sections 144, 146 extending generally perpendicular to the base section 142. In such an embodiment, the first plurality of sub-plates 140 are preferably placed generally side-by-side with one another to form the first major surface 112. The first plurality of anchors 114 are preferably formed by the first and/or second flange sections 144, 146 of at least some of the first plurality of sub-plates 140, with adjacent flange sections 144, 146 abutting one another to form one of the first plurality of anchors 114.

The second major surface 132 in a preferred embodiment may include a second plurality of sub-plates 160. The second major surface 132 may be formed solely by the second plurality of sub-plates 160, or at least some of the second major surface 132 may be also be formed by a portion of the tubes 154, plurality of beams 162, or corrugated support member 156. The second plurality of sub-plates 160 may each have and L-shape, with each having a base section 142 and a flange section 144. Alternatively, each of the second plurality of sub-plates 160 may have a U-shape, with a base section 142, a first flange section 144, and a second flange section 146. The flange sections 144, 146 may extend generally perpendicularly to the base section 142 and outwardly from the core body 108 to form the second plurality of anchors 134. Those of ordinary skill in the art will appreciate from this disclosure that the second plurality of sub-plates 160 may have the same elements, limitations, and functions as the first plurality of sub-plates 140 without exceeding the scope of this disclosure.

It is preferred that the first plurality of sub-plates 140 and second plurality of sub-plate 160 be formed of suitably strong materials which can support a crane 102 and the first and second strengthening layers 116, 136. Preferably, these are formed of steel, iron, aluminum, alloy, or polyvinyl chloride. However, those or ordinary skill in the art will appreciate from this disclosure that these elements may be formed of any suitable material, including titanium and synthetic materials, without exceeding the scope of this disclosure.

Referring to FIGS. 1 and 7-21, the construction panel preferably also includes at least one tie-point box 124 located in the core body 108 with which a crane hook 107 might engage to lift the construction panel 100. Preferably, there are at least two tie-point boxes 124 on opposite lateral ends of the construction panel 100, to allow the construction panel 100 to remain roughly parallel to the ground when lifted by the crane 102. Most preferably, the two tie-point boxes 124 are positioned on diagonally opposed corners of the construction panel 100, to better ensure the construction panel 100 remains parallel to the ground when lifted by a crane 102. The crane 102 may lift the construction panel 100 using two crane hooks 107 on a lift cable 106 having been threaded through lift hoops 105.

The tie-point box or boxes 124 preferably include a perimeter sidewall 165 defining the edges of the tie-point box 124 and defining a passage 164 through the construction panel 100. The perimeter sidewall 165 of a preferred embodiment necessarily must be at least as tall as the form sides 126. This ensures that the perimeter sidewall 165 may extend outward past the first and second major surfaces 112, 132 such that the passage 164 of the tie-point 124 box extends all the way through the construction panel 100 and is not obstructed by the first and second strengthening layers 116, 136 that are located on the first and second major surfaces 112 and 132, respectively. In a preferred embodiment, tie-point boxes may be positioned in one of the plurality of voids 110, preferably between two of the plurality of tubes 154, although in other embodiments tie-point boxes 124 may be positioned between two of the plurality of beams 162 or in the voids defined by the corrugated support member 156.

It is further preferred that a lift anchor 130 is located within the tie-point box 124. The lift anchor 130 is preferably configured to engage a crane hook 102. In order to provide adequate support to the lift anchor 130, it is preferred that the lift anchor 130 pass fully through the entire width of the perimeter sidewall 165 and to be welded in place using welds 168 in the passage 164. Welds 168 between the perimeter sidewall 165 and the plurality of tubes 154, as well as welds between the perimeter sidewall 165 and the first and second major surfaces 112, 132, may hold the tie-point box 124 in place. However, those of ordinary skill in the art will appreciate from this disclosure that any suitable means for retaining the tie-point box 124 within the core body 108, such as fasteners, screws, rivets, brackets, and other welds, may be substituted without exceeding the scope of this disclosure.

It is preferred that the tie-point boxes 124 and their component parts be formed of suitably strong materials which can support the weight of the construction panel 100 when lifted by a crane 102. Preferably, these are formed of steel, iron, aluminum, alloy, or polyvinyl chloride. However, those or ordinary skill in the art will appreciate from this disclosure that these elements may be formed of any suitable material, including titanium and synthetic materials, without exceeding the scope of this disclosure.

Referring to FIGS. 25-28, in some preferred embodiments the core body 108 preferably includes a shear-sleeve 138 which extends through the core body 108 with an orientation generally perpendicularly to the vertical supports therein. That is to say that it is preferred that the shear-sleeve 138 run generally perpendicular to the plurality of tubes 154 or the plurality of beams 162. This may require that a plurality of shear-sleeve holes 139 be cut through the tubes 154 or beams 162. Such a configuration may allow a lift cable 106 to be inserted through the shear-sleeves 138 in multiple construction panels 100 to allow a crane 102 to lift or move multiple construction panels at the same time.

It is preferred that the shear-sleeve 138 be formed of suitably strong materials which can support the weight of the construction panel 100 when lifted by a crane 102. Preferably, this may be formed of steel, iron, aluminum, alloy, or polyvinyl chloride. However, those or ordinary skill in the art will appreciate from this disclosure that these elements may be formed of any suitable material, including titanium and synthetic materials, without exceeding the scope of this disclosure.

The plurality of fasteners 128 are preferably configured to have the strength and durability to maintain the shape of the construction panel 100. Screws or rivets are some of the preferred fasteners 128. However, those or ordinary skill in the art will appreciate from this disclosure that any suitable fastening means may be used and of any suitable materials, including titanium and synthetic materials, without exceeding the scope of this disclosure.

Referring to FIG. 45, in a preferred embodiment, the construction panel 100 may include a corrugated support member 156, form sides 126 positioned at a diagonal along the lateral sides of the construction panel 100, and one of the plurality of tubes 152 connected to the outside side of the form sides 126. In this preferred embodiment, one tube 152 is positioned closer to the top of the construction panel 100, and one tube 152 is positioned closer to the bottom of the construction panel 100. Such a configuration may allow two construction panels 100 to interlock on one side to create a more stable platform. Those of ordinary skill in the art will appreciate from this disclosure that the component parts of the construction panel 100 may be combined in any fashion to provide an interlocking plurality of construction panels 100 without exceeding the scope of this disclosure.

Referring to FIGS. 1-9, one method for assembling the construction panel 100 operates as follows. A plurality of tubes 154 may be laid out roughly parallel to one another, with the space between being approximately the width of a tube 154. These spaces may define the plurality of voids 110. Pre-formed pieces of insulation 170 may be placed in these spaces, and the spaces may still define a plurality of voids 110. Optionally, one or more tie-point boxes 124 may be placed in one or more of the plurality of voids 110 and welded to two of the tubes 154. The first major surface 112 may then be affixed to the top of the tubes 154 using a plurality of fasteners 128. The first major surface 112 may be formed of a single piece or of a first plurality of sub-plates 140, each being affixed to two tubes 154. The core body 108 as it exists at the time may then be flipped, and the second major surface 132 may then be affixed to the tubes 154 using a plurality of fasteners 128. The second major surface 132 may be formed of a single piece or of a second plurality of sub-plates 160, each being affixed to two tubes 154. If tie-point boxes 124 are included, portions of the first and second major surfaces 112, 132 may be cut away so as to not obstruct the passage 164 in the tie-point boxes 124. Form sides 126 may then be affixed to the perimeter of the core body 108.

The second strengthening layer 136 may then be affixed to the second major surface 132. In a preferred embodiment, the second strengthening layer 136 is formed of a quick drying liquid, such a cement, and so the cement may be poured onto the second major surface 132. The form sides 126 may ensure the cement remains on the second major surface 132. As a liquid, the cement may flow under and around the second plurality of anchors 134 and, when it hardens, the second strengthening layer 136 may be fully affixed to the core body 108.

The construction panel 100 as constituted at that point, including the core body 108 and the second strengthening layer 136, may then be flipped over so the second strengthening layer 136 is facing downward and the first major surface 112 may be facing upward. The construction panel 100 at this step may be resting on the second strengthening layer 136 or may be positioned onto footers 101. The first strengthening layer 116 may then be affixed to the first major surface 112. In a preferred embodiment, the first strengthening layer 116 is formed of a quick drying liquid, such a cement, and so the cement may be poured onto the first major surface 112. The form sides 126 may ensure the cement remains on the first major surface 112. As a liquid, the cement may flow under and around the first plurality of anchors 114 and, when it hardens, the first strengthening layer 116 may be fully affixed to the core body 108. The construction panel 100 may then be fully constructed. Those of ordinary skill in the art will appreciate from this disclosure than these steps may be formed in any order, and any steps may be omitted or added, without exceeding the scope of this disclosure.

Referring to FIGS. 1-2, 11-12, 16-19, and 25-28, one method of use of the construction panel 100 operates as follows. One or more construction panels 100 may be assembled a preferred method. The construction panels 100 may then be placed in a generally contiguous fashion, to from a rough platform, using a crane 102, forklift, or other machinery suitable for heavy lifting. A crane 102 may then be positioned on the construction panels 100, with its crane feet 104 preferably positioned on the construction panels 100, possibly on outriggers.

In order to move additional construction panels into place, crane hoops 105 may be attached to the crane 102 with a lift cable 106 ending in crane hooks 107 on both ends. The crane hooks 107 may be engaged with separate lift anchors 130 in a construction panel 100. As the crane arm of the crane 102 is lifted, the lift cable 106 may grow taut and the construction panel 100 may be lifted while retaining is flat horizontal orientation. The construction panel 100 may then be placed where desired before the crane hooks 107 are disengaged from the lift anchors 130.

In an alternate embodiment, lift cables 106 may be inserted through both shear-sleeves 138 in the lateral ends of one or more construction panels 100. The ends of the lift cable 106 may then engage at least one crane hook 107 and then the lifted by the crane 102 and placed where desired. This may allow one or more construction panels 100 to be moved and placed simultaneously. Those of ordinary skill in the art will appreciate from this disclosure than these steps may be formed in any order, and any steps may be omitted or added, without exceeding the scope of this disclosure.

It is recognized by those skilled in the art that changes may be made to the above described methods and structures without departing from the broad inventive concept thereof.

It is understood, therefore, that this invention is not limited to the particular embodiments disclosed, but is intended to cover all modifications which are within the spirit and scope of the invention as defined by the above specification, the appended claims and/or shown in the attached drawings.

What is claimed is:

1. A construction panel, comprising:
   a core body of the panel comprising a first major surface and a second major surface, the first and second major surfaces being spaced apart and generally parallel to each other, the core body defining a plurality of voids therein;
   a first plurality of anchors disposed on the first major surface and extending generally outwardly from the core body;
   a second plurality of anchors disposed on the second major surface and extending generally outwardly from the core body;
   a first strengthening layer secured to the first major surface of the core body with the first plurality of anchors embedded therein; and
   a second strengthening layer secured to the second major surface of the core body with the second plurality of anchors embedded therein, wherein the first major surface of the core body is formed by a first plurality of sub-plates each having an L-shape with a base section and a flange section which extends generally perpendicularly to the base section, the first plurality of sub-plates being positioned generally side-by-side with an overlap between the base section of adjacent sub-plates to form the first major surface, the first plurality of anchors being formed by the flange section of at least some of the first plurality of sub-plates.

2. The construction panel of claim 1, further comprising a corrugated support member disposed between the first major surface and the second major surface, the corrugated support member contacting both the first major surface and the second major surface.

3. The construction panel of claim 1, further comprising, a tie-point box located in the core body, the tie-point box being formed by a perimeter sidewall which encloses a passage, the perimeter sidewall extending outward past the first and second major surfaces such that the passage of the tie-point box extends through the construction panel and is not obstructed by the first and second strengthening layers that are located on the first and second major surfaces, respectively, a lift anchor being located within the tie-point box, wherein the flange section of at least some of the first plurality of sub-plates include at least one of: a plurality of crimped sections, a plurality of cut-outs, and a plurality of flaps, wherein the core body further comprises a shear-sleeve extending therethrough and oriented generally perpendicularly with the plurality of tubes.

4. The construction panel of claim 1, wherein the flange section of at least some of the plurality of sub-plates define a plurality of grooves therein, a plurality of rods located in the plurality of grooves.

5. The construction panel of claim 2, wherein the corrugated support member comprises a plurality of sub-members arranged to form a corrugated shape, wherein adjacent sub-members are secured to the first major surface via a plurality of fasteners that each extend through the first major surface and through each of the adjacent sub-members.

6. The construction panel of claim 1, wherein the first strengthening layer includes a plurality of grooves therein.

7. The construction panel of claim 1, further comprising a plurality of tubes disposed between the first major surface and the second major surface, the plurality of tubes being generally parallel to each other and each contacting both the first major surface and the second major surface.

8. The construction panel of claim 1, further comprising a corrugated support member disposed between the first major surface and the second major surface, the corrugated support member contacting both the first major surface and the second major surface.

9. The construction panel of claim 7, further comprising a plurality of beams each having a C-shaped cross section disposed between the first major surface and the second major surface, the plurality of beams each contacting both the first major surface and the second major surface.

10. The construction panel of claim 7, further comprising: a tie-point box located in the core body, the tie-point box being formed by a perimeter sidewall which encloses a passage, the perimeter sidewall extending outward past the first and second major surfaces such that the passage of the tie-point box extends through the construction panel and is not obstructed by the first and second strengthening layers that are located on the first and second major surfaces, respectively, a lift anchor being located within the tie-point box, wherein the flange section of at least some of the first plurality of sub-plates include at least one of: a plurality of crimped sections, a plurality of cut-outs, and a plurality of flaps, wherein the core body further comprises a shear-sleeve extending therethrough and oriented generally perpendicularly with the plurality of tubes.

11. The construction panel of claim 8, wherein the flange section of at least some of the plurality of sub-plates define a plurality of grooves therein, a plurality of rods located in the plurality of grooves.

12. The construction panel of claim 8, wherein the corrugated support member comprises a plurality of sub-members arranged to form a corrugated shape, wherein adjacent sub-members are secured to the first major surface via a plurality of fasteners that each extend through the first major surface and through each of the adjacent sub-members.

13. The construction panel of claim 4, wherein the plurality of grooves are angled relative to a direction that is planar perpendicular to the first major surface.

14. The construction panel of claim 13, the plurality of grooves are angled at forty-five degrees relative to the direction that is planar perpendicular to the first major surface.

15. A construction panel, comprising:
a core body of the panel comprising a first major surface and a second major surface, the first and second major surfaces being spaced apart and generally parallel to each other, the core body defining a plurality of voids therein;
a first plurality of anchors disposed on the first major surface and extending generally outwardly from the core body;
a second plurality of anchors disposed on the second major surface and extending generally outwardly from the core body;
a first strengthening layer secured to the first major surface of the core body with the first plurality of anchors embedded thereinwherein the first major surface of the core body is formed by a first plurality of sub-plates each having a U-shape, when viewed in cross section, formed by a base section and first and second flange sections which extend generally perpendicularly to the base section, the first plurality of sub-plates being oriented generally side-by-side to form the first major surface, the first plurality of anchors being formed by the first and second flange sections of at least some of the first plurality of sub-plates;
a corrugated support member disposed between the first major surface and the second major surface, the corrugated support member contacting both the first major surface and the second major surface.

16. The construction panel of claim 15, wherein the corrugated support member comprises a plurality of sub-members arranged to form a corrugated shape.

17. The construction panel of claim 16, wherein adjacent sub-members are secured to the first major surface via a plurality of fasteners that each extend through the first major surface and through each of the adjacent sub-members.

18. The construction panel of claim 15, wherein the flange section of at least some of the plurality of sub-plates define a plurality of grooves therein, a plurality of rods located in the plurality of grooves.

19. The construction panel of claim 18, wherein the plurality of grooves are angled relative to a direction that is planar perpendicular to the first major surface.

20. The construction panel of claim 19, the plurality of grooves are angled at forty-five degrees relative to the direction that is planar perpendicular to the first major surface.

* * * * *